(12) United States Patent
Okazaki

(10) Patent No.: US 10,529,029 B2
(45) Date of Patent: Jan. 7, 2020

(54) PLATFORM, SYSTEMS, AND METHODS FOR IDENTIFYING PROPERTY CHARACTERISTICS AND PROPERTY FEATURE MAINTENANCE THROUGH AERIAL IMAGERY ANALYSIS

(71) Applicant: Aon Benfield Inc., Chicago, IL (US)

(72) Inventor: Takeshi Okazaki, Tokyo (JP)

(73) Assignee: Aon Benfield Inc., Chicago, IL (US)

( * ) Notice: Subject to any disclaimer, the term of this patent is extended or adjusted under 35 U.S.C. 154(b) by 26 days.

(21) Appl. No.: 15/714,376

(22) Filed: Sep. 25, 2017

(65) Prior Publication Data

US 2018/0089763 A1  Mar. 29, 2018

Related U.S. Application Data

(60) Provisional application No. 62/398,665, filed on Sep. 23, 2016.

(51) Int. Cl.
*G06Q 40/00* (2012.01)
*G06Q 40/08* (2012.01)
(Continued)

(52) U.S. Cl.
CPC ............ *G06Q 40/08* (2013.01); *G06F 16/51* (2019.01); *G06K 9/00637* (2013.01);
(Continued)

(58) Field of Classification Search
USPC ........... 705/2, 3, 4, 35, 39, 38, 37; 701/516; 382/103; 340/539.11; 707/736; 348/47
See application file for complete search history.

(56) References Cited

U.S. PATENT DOCUMENTS 6,732,120 B1 * 5/2004 Du .................. G01C 21/20
715/764
8,078,436 B2  12/2011 Pershing et al.
(Continued)

FOREIGN PATENT DOCUMENTS

WO    2012054239 A2    4/2012
WO    2012054239 A3    4/2012
(Continued)

OTHER PUBLICATIONS

International Search Report and Written Opinion issued in International Application No. PCT/US2017/053265 dated Dec. 11, 2017.
(Continued)

*Primary Examiner* — Tien C Nguyen
(74) *Attorney, Agent, or Firm* — Gardella Grace P.A.

(57) ABSTRACT

In an illustrative embodiment, methods and systems for automatically categorizing a repair condition of a property characteristic may include obtaining aerial imagery of a geographic region including the property, identifying features of the aerial imagery corresponding to the property characteristic, analyzing the features to determine a property characteristic classification, and analyzing a region of the aerial imagery including the property characteristic to determine a condition classification. The methods and systems may further include determining, using the property characteristic classification and the condition classification, a risk estimate of damage to the property due to one or more disasters and/or a cost estimate of repair or replacement of the property characteristic.

20 Claims, 15 Drawing Sheets

(51) Int. Cl.
*G06N 3/04* (2006.01)
*G06N 3/08* (2006.01)
*G06K 9/62* (2006.01)
*G06K 9/00* (2006.01)
*G06T 11/60* (2006.01)
*G06F 16/51* (2019.01)
*G06K 9/46* (2006.01)

(52) U.S. Cl.
CPC ....... *G06K 9/00671* (2013.01); *G06K 9/6212* (2013.01); *G06K 9/6256* (2013.01); *G06K 9/6267* (2013.01); *G06K 9/6273* (2013.01); *G06N 3/04* (2013.01); *G06N 3/0454* (2013.01); *G06N 3/08* (2013.01); *G06T 11/60* (2013.01); *G06K 9/4604* (2013.01); *G06K 9/4642* (2013.01); *G06K 9/4652* (2013.01); *G06T 2210/04* (2013.01)

(56) References Cited

U.S. PATENT DOCUMENTS

| | | | |
|---|---|---|---|
| 8,145,578 B2 | 3/2012 | Pershing et al. | |
| 8,170,840 B2 | 5/2012 | Pershing | |
| 8,209,152 B2 | 6/2012 | Pershing | |
| 8,346,578 B1* | 1/2013 | Hopkins, III | G06Q 40/00 382/100 |
| 8,401,222 B2 | 3/2013 | Thornberry et al. | |
| 8,515,125 B2 | 8/2013 | Thornberry et al. | |
| 8,542,880 B2 | 9/2013 | Thornberry et al. | |
| 8,670,961 B2 | 3/2014 | Pershing et al. | |
| 8,682,079 B1 | 3/2014 | Ouzounis | |
| 8,731,234 B1* | 5/2014 | Ciarcia | G06K 9/00637 382/100 |
| 8,775,219 B2* | 7/2014 | Swanson | G06Q 50/16 705/4 |
| 8,818,770 B2 | 8/2014 | Pershing | |
| 8,825,454 B2 | 9/2014 | Pershing | |
| 8,873,842 B2 | 10/2014 | Robinson et al. | |
| 8,977,520 B2 | 3/2015 | Stephens et al. | |
| 8,995,757 B1 | 3/2015 | Ciarcia et al. | |
| 9,031,325 B2 | 5/2015 | Ouzounis | |
| 9,070,018 B1 | 6/2015 | Ciarcia et al. | |
| 9,129,376 B2 | 9/2015 | Pershing | |
| 9,135,737 B2 | 9/2015 | Pershing | |
| 9,141,872 B2 | 9/2015 | Marchisio et al. | |
| 9,147,132 B2 | 9/2015 | Marchisio et al. | |
| 9,183,538 B2 | 11/2015 | Thornberry et al. | |
| 9,230,168 B2 | 1/2016 | Gueguen | |
| 9,244,589 B2 | 1/2016 | Thornberry et al. | |
| 9,329,749 B2 | 5/2016 | Thornberry et al. | |
| 9,330,494 B2 | 5/2016 | Schultz | |
| 9,495,618 B1 | 11/2016 | Tabb | |
| 9,501,700 B2 | 11/2016 | Loveland et al. | |
| 9,514,568 B2 | 12/2016 | Pershing et al. | |
| 9,569,690 B2 | 2/2017 | Marchisio et al. | |
| 9,589,210 B1 | 3/2017 | Estrada et al. | |
| 9,619,734 B2 | 4/2017 | Marchisio et al. | |
| 9,639,960 B1 | 5/2017 | Loveland et al. | |
| 9,679,227 B2 | 6/2017 | Taylor et al. | |
| 9,767,565 B2 | 9/2017 | Estrada et al. | |
| 9,846,915 B2* | 12/2017 | Howe | G06Q 40/08 |
| 9,858,645 B2 | 1/2018 | Malitz | |
| 9,875,509 B1 | 1/2018 | Harvey et al. | |
| 9,904,849 B2 | 2/2018 | Estrada et al. | |
| 9,928,553 B1 | 3/2018 | Harvey et al. | |
| 9,933,254 B2 | 4/2018 | Thornberry et al. | |
| 9,959,667 B2 | 5/2018 | Schultz | |
| 10,013,774 B2 | 7/2018 | Estrada et al. | |
| 10,102,589 B1 | 10/2018 | Tofte et al. | |
| 10,134,092 B1 | 11/2018 | Harvey et al. | |
| 10,137,984 B1 | 11/2018 | Flick | |
| 10,157,479 B2 | 12/2018 | Estrada et al. | |
| 10,163,164 B1 | 12/2018 | Tofte et al. | |
| 10,173,773 B1 | 1/2019 | Flick | |
| 10,178,303 B2 | 1/2019 | Castillo et al. | |
| 10,198,857 B2 | 2/2019 | Schultz | |
| 10,217,207 B2 | 2/2019 | Marra et al. | |
| 10,311,302 B2 | 6/2019 | Kottenstette et al. | |
| 10,346,935 B2 | 7/2019 | Thornberry et al. | |
| 10,402,676 B2 | 9/2019 | Wang et al. | |
| 10,410,289 B1 | 9/2019 | Tofte et al. | |
| 10,453,147 B1 | 10/2019 | Davis | |
| 2005/0063563 A1* | 3/2005 | Soliman | H04N 1/00204 382/104 |
| 2009/0265193 A1* | 10/2009 | Collins | G06Q 30/0185 705/4 |
| 2010/0179787 A2* | 7/2010 | Pershing | G06Q 10/00 702/156 |
| 2010/0215212 A1* | 8/2010 | Flakes, Jr. | G01M 5/0025 382/100 |
| 2012/0209782 A1 | 8/2012 | Pershing et al. | |
| 2013/0226667 A1* | 8/2013 | Terrazas | G06Q 30/0205 705/7.34 |
| 2013/0311240 A1 | 11/2013 | Pershing et al. | |
| 2014/0019166 A1 | 1/2014 | Swanson et al. | |
| 2014/0032433 A1* | 1/2014 | Eick | G06Q 50/163 705/314 |
| 2014/0237430 A1 | 8/2014 | Thornberry et al. | |
| 2014/0245165 A1 | 8/2014 | Battcher et al. | |
| 2014/0245210 A1 | 8/2014 | Battcher et al. | |
| 2014/0278697 A1 | 9/2014 | Thornberry et al. | |
| 2015/0025914 A1 | 1/2015 | Lekas | |
| 2015/0178416 A1 | 6/2015 | Stephens et al. | |
| 2015/0302529 A1 | 10/2015 | Jagannathan | |
| 2015/0310557 A1 | 10/2015 | Engelhom | |
| 2015/0310558 A1 | 10/2015 | Cuttell et al. | |
| 2015/0317740 A1 | 11/2015 | Emison et al. | |
| 2015/0325064 A1* | 11/2015 | Downey | H04W 4/029 701/29.3 |
| 2015/0363717 A1 | 12/2015 | Lim | |
| 2015/0370928 A1 | 12/2015 | Pershing | |
| 2016/0063642 A1 | 3/2016 | Luciani et al. | |
| 2016/0086285 A1* | 3/2016 | Jordan Peters | G06Q 40/08 705/4 |
| 2016/0155097 A1 | 6/2016 | Venkatesha | |
| 2016/0259994 A1 | 9/2016 | Ravindran et al. | |
| 2016/0350907 A1 | 12/2016 | Simula et al. | |
| 2017/0053436 A1 | 2/2017 | Pershing et al. | |
| 2017/0154131 A1 | 6/2017 | Loveland et al. | |
| 2017/0161559 A1 | 6/2017 | Du et al. | |
| 2017/0277980 A1 | 9/2017 | Taylor et al. | |
| 2017/0330032 A1 | 11/2017 | Du et al. | |

FOREIGN PATENT DOCUMENTS

| | | |
|---|---|---|
| WO | 2013123354 A1 | 8/2013 |
| WO | 2013142406 A1 | 9/2013 |
| WO | 2014151122 A1 | 9/2014 |
| WO | 2015009798 A1 | 1/2015 |
| WO | 2015017366 A1 | 2/2015 |
| WO | 2015017855 A1 | 2/2015 |
| WO | 2015038358 A1 | 3/2015 |
| WO | 2016053791 A1 | 4/2016 |
| WO | 2017040691 A1 | 3/2017 |
| WO | 2017142788 A1 | 8/2017 |
| WO | 2017151673 A1 | 9/2017 |
| WO | 2017186515 A1 | 11/2017 |
| WO | 2018058044 A1 | 3/2018 |

OTHER PUBLICATIONS

International Patent Report on Patentability issued in International Application No. PCT/US2017/053265 dated Mar. 26, 2019.
Lin, et al., Network in Network, International Conference on Learning Representations, 2014, pp. 10.
Krizhevsky, et al., ImageNet Classification with Deep Convolutional Neural Networks, Advances in neural information processing systems, 2012, pp. 9.

* cited by examiner

PLATFORM, SYSTEMS, AND METHODS FOR IDENTIFYING PROPERTY CHARACTERISTICS AND PROPERTY FEATURE MAINTENANCE THROUGH AERIAL IMAGERY ANALYSIS

RELATED APPLICATIONS

This application claims priority to U.S. Provisional Patent Application Ser. No. 62/398,665, entitled "Platform, Systems, and Methods for Identifying Property Characteristics and Property Feature Maintenance Through Aerial Imagery Analysis," filed Sep. 23, 2016, hereby incorporated by reference in its entirety.

BACKGROUND

A risk exposure database contains a compilation of as many building properties or characteristics relevant to insurance as possible. These properties can include characteristics like location coordinates, address, slope, and elevation, Other characteristics include construction type, occupancy type, year built and/or year of renovation, building height, soft stories, number of stories, and floor area. Further characteristics can include roof condition, roof shape, roof covering, roof anchors, roof equipment, cladding, and pounding (distance to closest building). Some of these characteristics can only be assessed by on-site inspections or by official documentation, but others can be measured using visual imagery.

Characteristics addressed in this disclosure include roof shape and roof condition. In one example, roof shapes can be broken into five categories: gambrel roof, gable roof, hipped roof, square roof, and flat roof. Each roof shape has a unique response and damage vulnerability to different natural perils like earthquake or wind.

Deep learning involves computational models composed of multiple processing layers to learn representations of data with multiple levels of abstractions. These models can be thought of as a way to automate predictive analytics. Representation learning is a set of methods that allows a machine to be fed with raw data and to automatically discover the representations needed for detection or classification. Use cases for deep learning include voice recognition, motion detection, translation, and medical diagnosis. By using deep learning algorithms and sample datasets, computers can learn to distinguish and classify a wide range of characteristics to high levels of accuracy, often surpassing the recognition levels of human beings.

One model used for deep learning is the Network in Network model described in the paper "Network In Network" by M. Lin et al. and published in the International Conference on Learning Representations, 2014 (arXiv: 1409.1556), the contents of which are hereby incorporated by reference in its entirety. Using the Network in Network model, a number of layers of artificial perception outcomes are generated using micro neural networks with complex structures. The artificial perception outcomes are then stacked and averaged to generate a single global average pooling layer for classification.

When applied to visual recognition, deep learning algorithms can break down an observation (e.g., an image) in a number of different ways to characterize features of the observation. In some examples, deep learning algorithms can be applied to review images as a set of intensity values per pixel, or in a more abstract way as a set of edges, regions of particular shape, etc. Some representations may demonstrate superior performance to others based upon the particular learning task. One of the promises of deep learning is replacing human identification of features with efficient algorithms for unsupervised or semi-supervised feature learning and hierarchical feature extraction.

The inventors recognized that deep learning methodology could be applied to risk exposure database population to analyze aerial imagery and automatically extract characteristics of individual properties, providing fast and efficient automated classification of building styles and repair conditions. In combining location-based vulnerabilities with individual property vulnerabilities identified in part through classification of repair conditions of one or more property features, risk of damage due to disaster can be more accurately estimated.

SUMMARY OF ILLUSTRATIVE EMBODIMENTS

The forgoing general description of the illustrative implementations and the following detailed description thereof are merely exemplary aspects of the teachings of this disclosure, and are not restrictive.

Systems, methods, and computing system platforms described herein support matching aerial image features of one or more properties to corresponding property conditions (e.g., maintenance levels of property features) through machine learning analysis. In a preferred application, the property condition analysis may be used in estimating damage risk in light of one or more disaster conditions, such as severe storms. The analysis may further aid in estimating costs of repair or replacement of each property, in one example, should a disaster cause the estimated damage. In another example, the analysis may be used to confirm that a property has been repaired.

In one aspect, the present disclosure relates to a method for automatically categorizing a repair condition of a property characteristic, including obtaining an aerial image of a geographic region including the property; identifying features of the aerial image corresponding to the property characteristic; analyzing the features to determine a property characteristic classification; analyzing a region of the aerial image including the property characteristic to determine a condition classification; and determining, using the property characteristic classification and the condition classification, a risk estimate of damage to the property due to one or more disasters. The property characteristic classification may be rooftop shape. Analyzing the features to determine a property characteristic may include applying a deep learning analysis model to the features. The deep learning analysis model may be NIN.

In some embodiments, analyzing the region of the aerial image including the property characteristic to determine the condition classification includes applying a machine learning analysis model to image pixels within the region. The machine learning analysis model may include a color histogram analysis model. The condition classification may encompass classifications good and bad. Determining the risk estimate may include applying a disaster risk profile corresponding to a first disaster of the at least one disaster and the property characteristic.

In one aspect, the present disclosure relates to a system for automatically categorizing a repair condition of a property characteristic, the system including processing circuitry and a non-transitory computer-readable medium having instructions stored thereon. In some embodiments, the instructions, when executed by the processing circuitry, cause the processing circuitry to obtain an aerial image of a geographic region including the property; identify features of the aerial image corresponding to the property characteristic; analyze the features to determine a property characteristic classification; analyze a region of the aerial image including the property characteristic to determine a condition classification; and determine, using the property characteristic classification and the condition classification, a replacement cost for replacing the property characteristic. The aerial image may be a two-dimensional aerial image.

In some embodiments, the instructions, when executed by the processing circuitry, cause the processing circuitry to, prior to identifying the features, obtain a shape map image including the property; overlay the aerial image with the shape map image; and determine whether a boundary of the property as identified by the shape map matches a boundary of the property as illustrated in the aerial image. The instructions, when executed by the processing circuitry, may cause the processing circuitry to, upon determining that the shape map does not match the boundary of the corresponding property, obtain an alternate aerial image of the property. The instructions, when executed by the processing circuitry, may cause the processing circuitry to, prior to identifying the features, assess orthogonality of the aerial imagery. The property may be a single family home.

In one aspect, the present disclosure relates to a non-transitory computer readable medium having instructions stored thereon, where the instructions, when executed by processing circuitry, cause the processing circuitry to receive identification of a property and at least one property characteristic; obtain an aerial image of a geographic region including the property; and identify respective features of the aerial image corresponding to each property characteristic of the at least one property characteristic. In some embodiments, the instructions, when executed by the processing circuitry, cause the processing circuitry to, for each property characteristic, analyze the corresponding features to determine a respective property characteristic classification, and analyze a region of the aerial image including the respective property characteristic to determine a respective condition classification. The instructions, when executed by the processing circuitry, may cause the processing circuitry to determine, using the property characteristic classification of each property characteristic and the condition classification of each property characteristic, at least one risk estimate representing risk of damage due to disaster.

In some embodiments, the instructions, when executed by the processing circuitry, cause the processing circuitry to, prior to obtaining the aerial image of the geographic region, determine, based upon the at least one property characteristic, a preferred image type corresponding to each property characteristic of the at least one property characteristic. The at least one property characteristic may include two or more property characteristics. The instructions, when executed by the processing circuitry, may cause the processing circuitry to, responsive to determining the preferred image type corresponding to a first property characteristic of the at least one property characteristic is a terrestrial image, obtain a terrestrial image of the geographic region including the property.

In some embodiments, the instructions, when executed by the processing circuitry, cause the processing circuitry to access one or more known property characteristics. Determining the at least one risk estimate may include determining the at least one risk estimate further based on the one or more known property characteristics. The one or more known property characteristics may include at least one of a property age, a property elevation, a property slope, a year built, a year renovated, and a building height.

In some embodiments, receiving identification of the property and the at least one property characteristic includes receiving, via a network from a remote computing device, the identification of the property. The instructions, when executed by the processing circuitry, may cause the processing circuitry to provide, via the network to the remote computing device in real-time responsive to receiving the at least one property characteristic, the at least one risk estimate.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
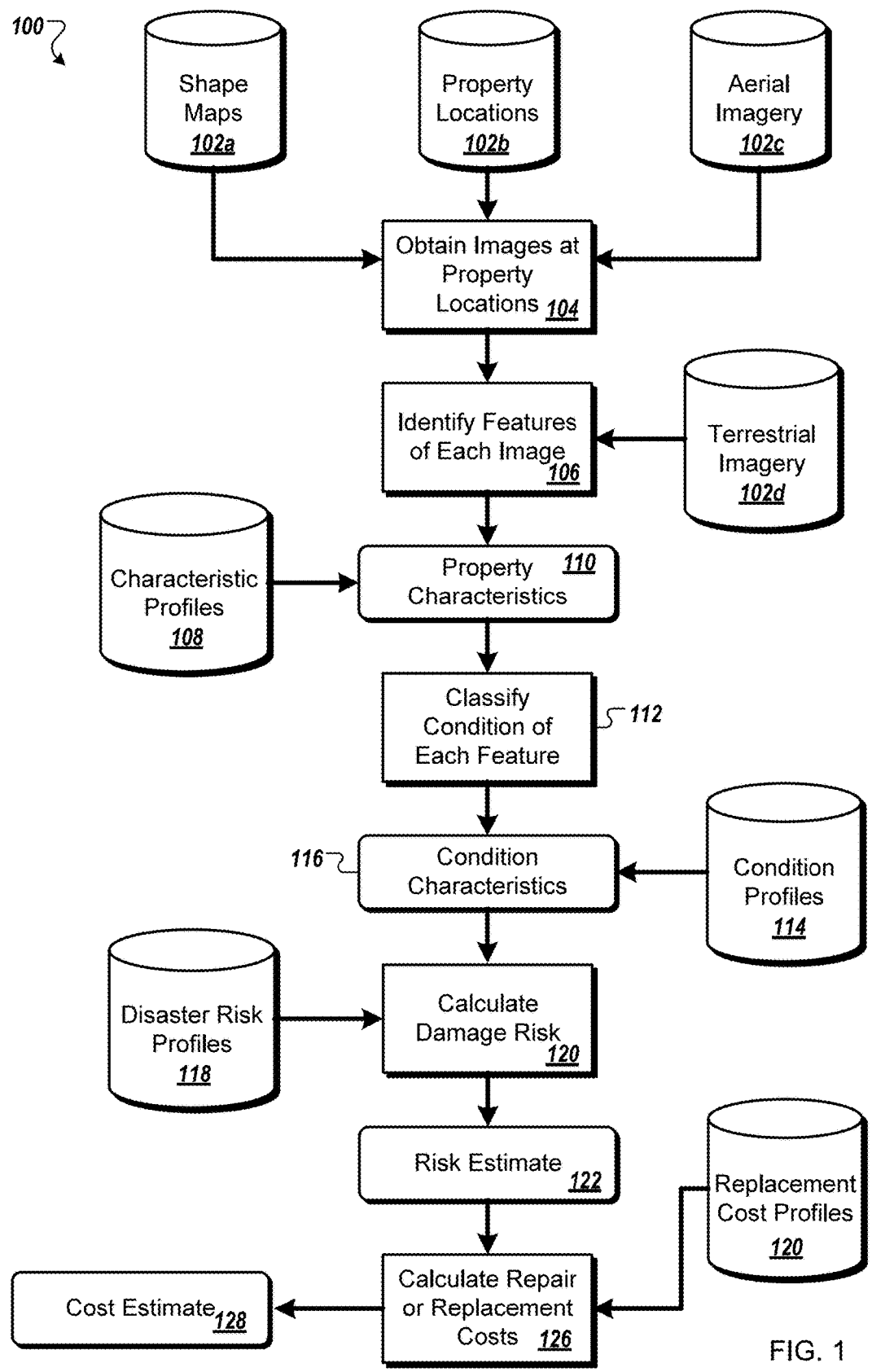
FIG. 1 is a flow diagram of an example system operational flow for matching aerial image features to corresponding property maintenance levels.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Figure 8A:
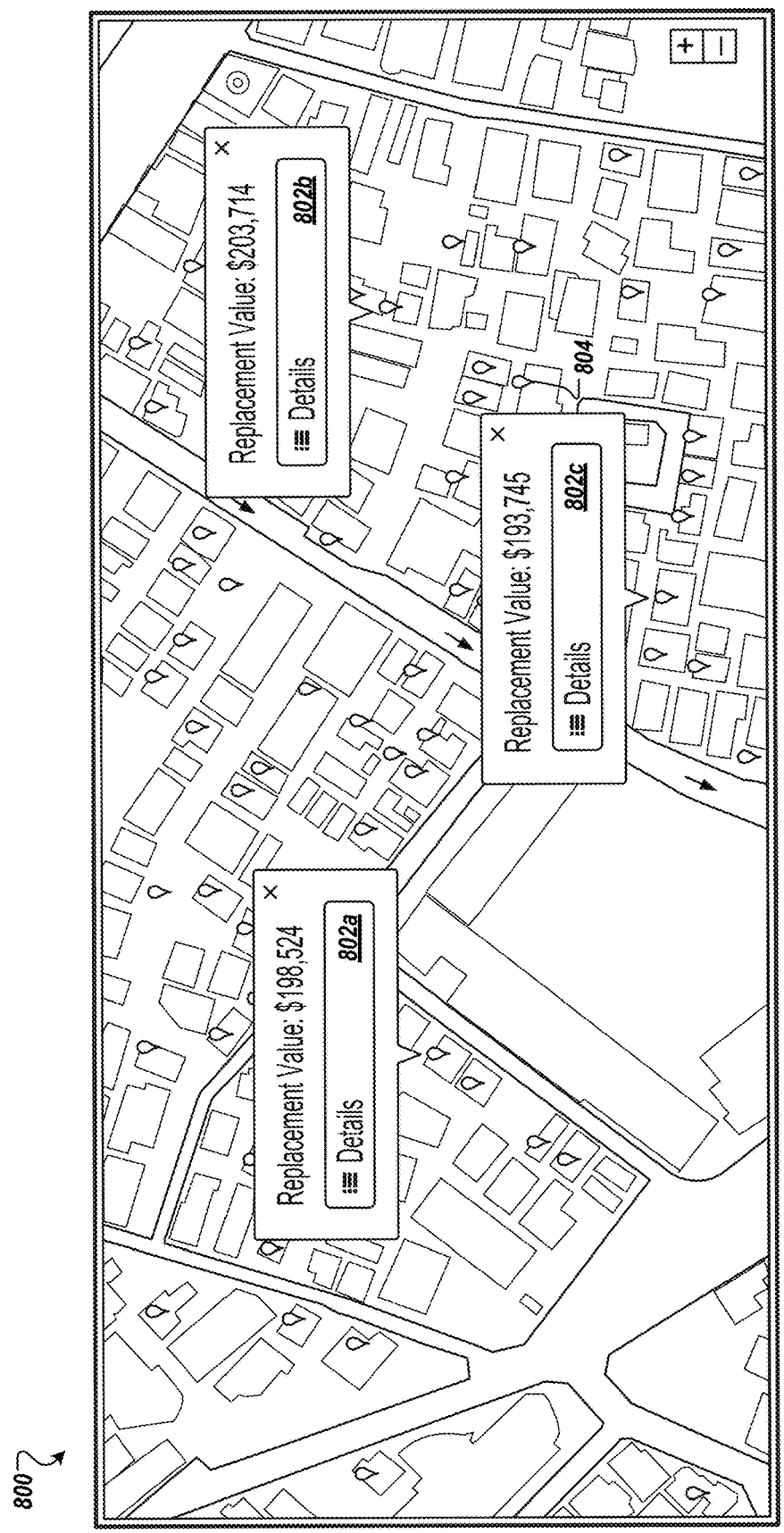
FIGS. 8A through 8C illustrate a series of example user interface screen shots for reviewing property characteristic and maintenance level information.

Turning to FIG. 1, a flow diagram of an example system operational flow 100 for matching aerial image features to corresponding property maintenance levels obtains images (104) at property locations 102b is illustrated. In some implementations, commencement of at least a portion of the operational flow 100 by the system may be triggered by a property classification request submitted by a user, such as an insurance carrier or real estate investment broker at a dashboard interface screen on a computing device connected to the system via a network. For example, as illustrated in FIG. 8A, a particular property or, alternatively, a neighborhood of properties, may be selected within a map view user interface 800. The operational flow 100 may be used to analyze the condition of features of each property at each property location 102b based on aerial imagery 102c. In some implementations, the operational flow 100 may aid in estimating costs of repair or replacement of each property characteristic detected in the aerial images, for example. In another example, the operational flow 100 may be used to confirm that a property location 102b has been repaired.

The property locations 102b may represent, in some examples, locations of properties insured by a particular insurer, locations of properties recently affected by a disaster such as a tornado, hurricane, earthquake, storm surge, or explosion, locations of properties held in an investment portfolio, or locations of properties considered for addition to an investment portfolio. The property locations 102b may be identified, in some examples, by a street address, global positioning system coordinates, or other geographic coordinates.

Figure 5A:
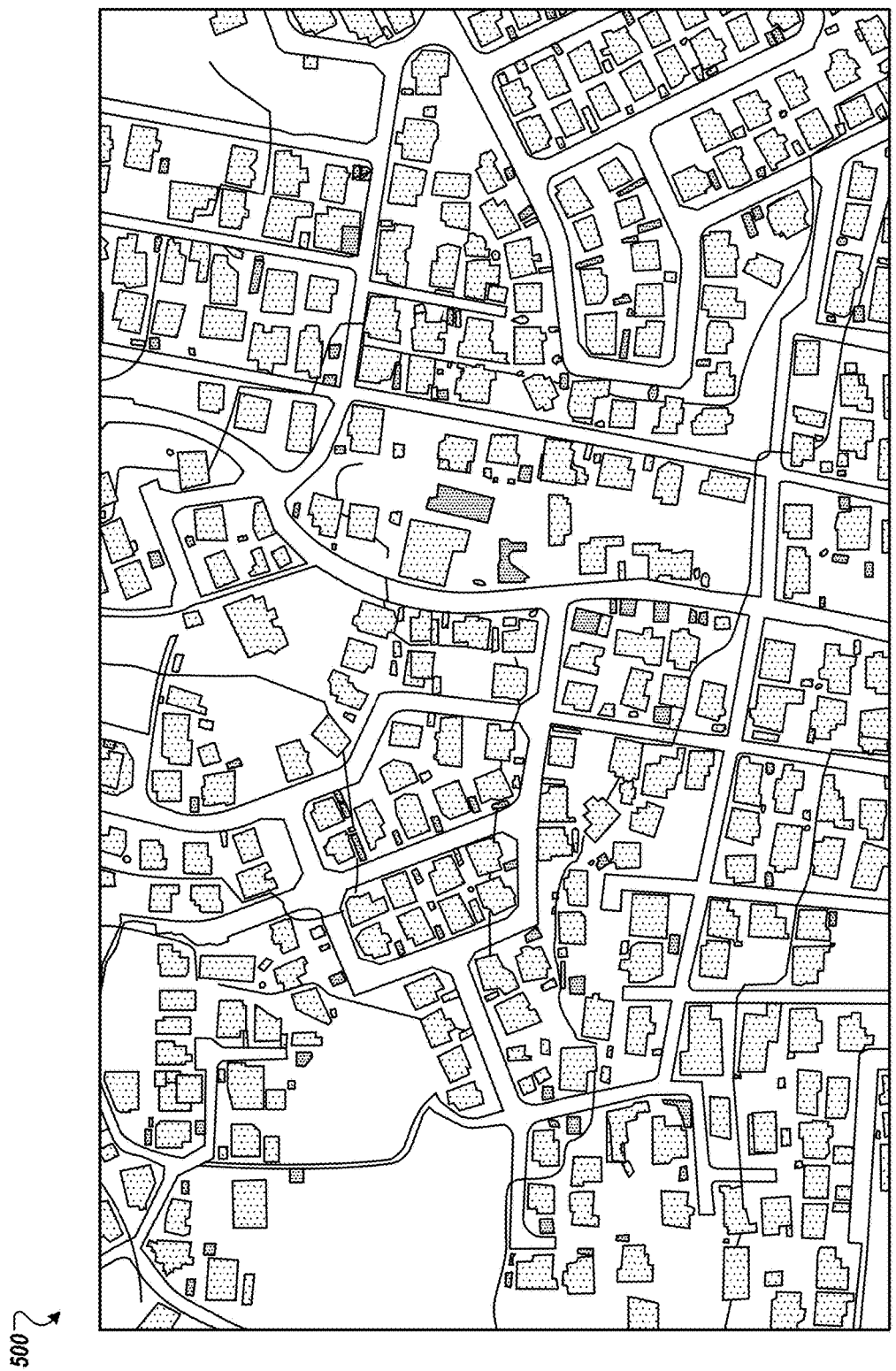
FIG. 5A illustrates an example structure shape map of a geographic area.
Figure 5B:
FIG. 5B illustrates an example two-dimensional aerial image of the geographic area of FIG. 5A.

In some implementations, the operational flow 100 obtains images (104) at each property location 102b. The images can include aerial imagery 102c stored by the system or accessed by the system from a remote networked location. The aerial imagery 102c, for example, may include a three-dimensional or two-dimensional image of a geographic location including at least one of the property locations 102b. In one example, based upon street address or geographic coordinates, the system may query a remote database to obtain recent aerial imagery 102c including an image of at least one of the property locations 102b. The remote database, in some examples, can include private industry databases such as Google® Earth images by Google, Inc. of Mountain View, Calif. or NTT Geospace Corporation of Japan. In other examples, the remote database can include one or more databases of publicly owned organizations such as the Geospatial Information Authority (GSI) of Japan, the United States Geological Survey, or the Federal Agency for Cartography and Geodesy of Germany. Aerial imagery can be collected from one or more remote network locations, in some embodiments, using an Open Source Geographic Information System (GIS) such as QGIS by the Open Source Geospatial Foundation (OSGeo). The format for the images of the property locations 102b, in some embodiments, depends upon the format accepted by the various sources available for aerial imagery 102c. An example aerial image 510 of multiple property locations 102b is illustrated in FIG. 5B.

In some embodiments, the system may be configured to query multiple remote database systems to obtain at least two aerial images of a given property location 102b. The aerial images available at the various databases, for example, may differ in resolution and recency of capture. Through collecting two or more images of a particular property, for example, the system may analyze each image to determine a best quality image for use in condition analysis. The condition analysis can include balancing of multiple factors such as, in some examples, clarity, completeness, and recency.

Further, in some embodiments, the system may be configured to query multiple remote database systems to obtain both a two-dimensional aerial image and a three-dimensional aerial image. Different property characteristics may be discerned based upon whether the aerial image is captured in two-dimensional or three-dimensional format. Two-dimensional aerial images, in some examples, can be used to determine location coordinates of the property, street name, occupancy type, floor area, existence of skylights, existence of chimneys, roof condition, roof shape, roof covering, roof anchors, roof equipment, and/or pounding. Three-dimensional aerial images, in comparison, can be used to determine location coordinates, street name, construction type, occupancy type, year built, building height, soft stories, number of stories, roof condition, roof shape, roof covering, roof anchors, roof equipment, cladding, and pounding. Where there is an overlap in characteristics identifiable using either a two-dimensional image or a three-dimensional image, in some embodiments, machine learning analysis of both images can be combined to provide increase confidence in identification of the individual characteristics.

In some implementations, the system obtains (104) shape map images 102a of each of the property locations 102b. The shape map images 102a, for example, include a block shape layout of existing properties in a municipality, such as urban planning maps used in urban planning and development. The shape map images 102a, in another example, can include block shape layout maps used in presenting information to a user of a computer-based navigation system. The shape map images 102a, in one example, can be obtained from Geospatial Information Authority of Japan or Zenrin Co. Ltd. of Japan. An example of an urban planning map 500 is illustrated in FIG. 5A (image obtained from the Geospatial Information Authority of Japan, Digital Map 2500 (Spatial Data Framework)).

Figure 5C:
FIG. 5C illustrates an example overlay map image of a section of the structure shape map of FIG. 5A overlaying a corresponding section of the aerial image of FIG. 5B.

The shape map images 102a, in some embodiments, are used to confirm location of a particular property. The shape map image 102a of a geographical area, for example, can be overlaid with a corresponding aerial image 102c to match properties with images. An example overlaid image 520 of planning map image 500 of FIG. 5A with aerial image 510 of FIG. 5B is illustrated in FIG. 5C. In some embodiments, the shape map image 102a may not match in shape or location with the aerial image 102c. As illustrated in FIG. 5C, for example, a shape map outline (illustrated in a thickened line) for a location 522 may not be rectangular, while a rooftop shape beneath the outline may be rectangular in shape. In some embodiments, analyzing multiple aerial images 102c to determine the best quality image may include identifying one or more aerial images 102c that substantially align with the corresponding shape map image 102a. The overlay of the aerial image 102c with the shape map image 102a, further, can be used in aiding in cropping the aerial image 102c to focus analysis on a particular property location 102b. For example, turning to FIG. 5C, property location 524 is substantially aligning with the corresponding planning map image, and the general outline can be used in aiding in cropping of the property location 524. In some examples, the property location 524 may be identified within the overlaid image 520 when the property location 524 aligns with a property in the overlaid image 520 within a predetermined tolerance in order to account for renovations that may have been made to the property 524, such as property additions that may alter an overall shape of the property.

Returning to FIG. 1, in some embodiments, the shape map images 102a may be used to correct or compensate for alignment errors or inconsistencies of the corresponding two-dimensional aerial images 102c. For example, an aerial image representing a normal orthophoto angle may not be directly centered upon the planning map block. Using the planning map block as a guide, for example, the aerial image can be geometrically corrected to obtain a true orthophoto version of the aerial image.

As illustrated in FIG. 1, in some implementations, the system identifies (106) features of each aerial image 102c to classify property characteristics. Using machine learning for analysis, for example, the system can extract features of the aerial image of a particular property location 102b. Groupings of extracted features, such as angles, outlines, substantially homogenous fields, etc. can be used to identify property features such as rooftop, swimming pool, chimney, and sky lights. Upon extracting image-related features identifiable as a property feature (e.g., rooftop), the extracted features may be analyzed to determine one or more property characteristics of that feature (e.g., type of rooftop). In one example, a swimming pool may be identified as the property feature of a pool (e.g., various shapes of outlines of a particular size or greater bordering a substantially homogenous field of blue), then characterized as a particular shape (e.g., rectangular, round, or kidney bean, etc.), type (e.g., above ground or in-ground), and/or size (e.g., approximate area). The machine learning classifier used in the machine learning analysis, in some embodiments, includes a convolutional neural network (CNN) to preprocess the aerial image 102c of the particular property location 102b and to classify the property features as property characteristics 110. Using CNN technology, for example, the biological process of visually reviewing and identifying an object or feature of an object is mimicked through a feed-forward artificial neural network where multilayer artificial perception minimizes preprocessing. CNN is a well-established and popular machine-learning methodology. An example of a CNN processing model is Alexnet. (See Krizhevksy et al. "ImageNet Classification with Deep Convolutional Neural Networks", Advances in neural information processing systems. 2012, the entire contents of which has been incorporated herein by reference). In other embodiments, the machine learning classifier may include a Network in Network (NIN) where a number of layers of artificial perception outcomes are generated using micro neural networks with complex structures. The artificial perception outcomes are then stacked and averaged to generate a single global average pooling layer for classification. NIN has demonstrated superior performance outcome to conventional CNN processing. Additionally, NIN processing is less storage-intensive than CNN processing.

In some implementations, property characteristic profiles 108 are used in classifying property features. The property characteristic profiles 108, for example, may be developed through training the machine learning algorithms using aerial images (and, in some embodiments, terrestrial images 102d) of known property characteristics. Each property feature, for example, may be broken down into multiple classifications. In an illustrative example involving a classification of terrestrial images, cladding can include stone, brick, stucco, shingles, vertical boards, horizontal boards, or metal. The machine learning algorithms, for example, may generate a percentage confidence in a match between a new aerial image 102c including a gambrel rooftop and the characteristic profile 108 of gambrel rooftops.

Figure 2A:
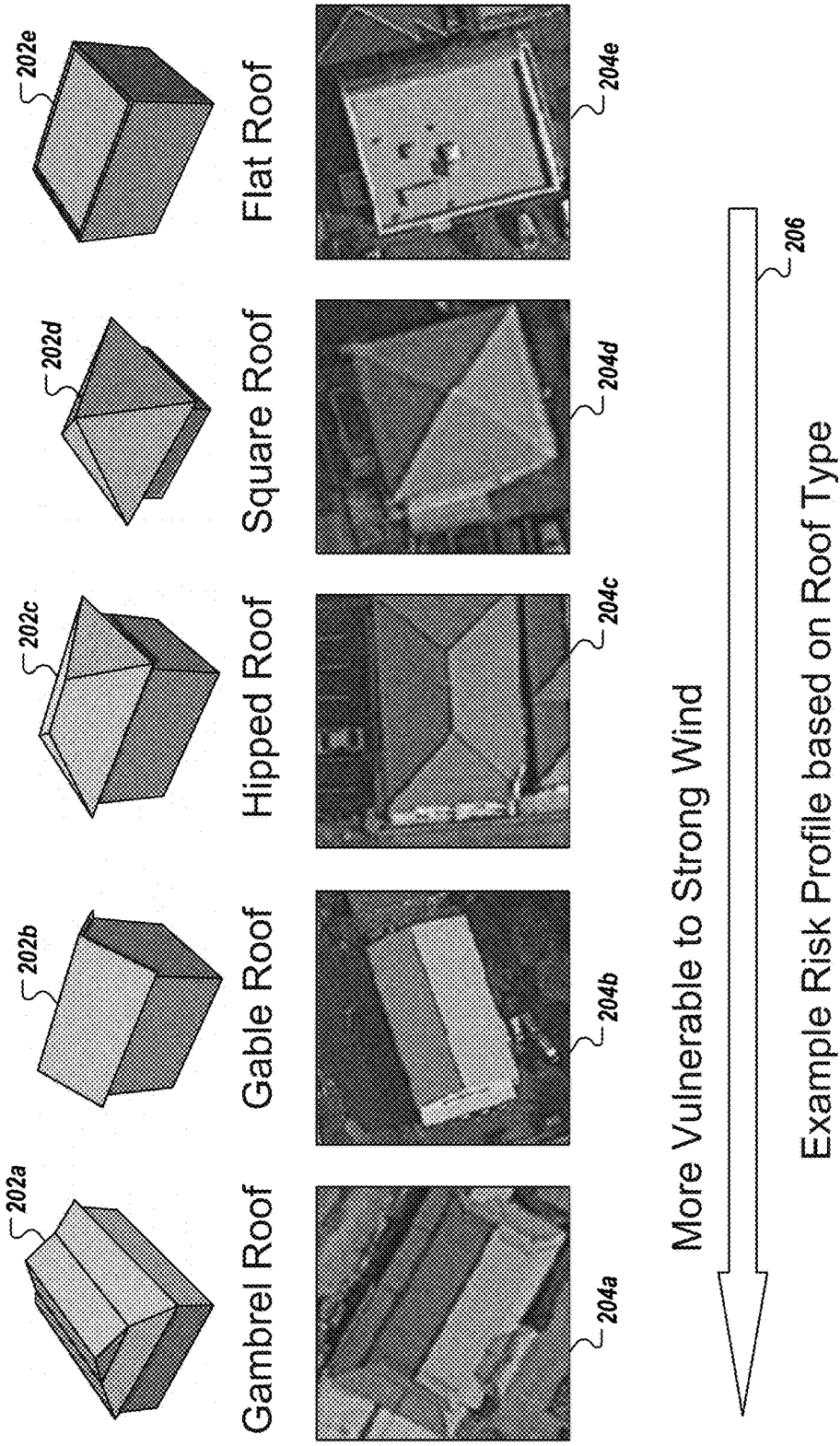
FIG. 2A illustrates example characteristic classifications and corresponding risk profile data.

In an illustrative example, turning to FIG. 2A, extracted angular and outline features of aerial images 204 may be used to classify a roof shape 202 of the particular property location 102b. In a first example, a gable roof 202b includes a central peak upon a generally rectangular outline, as depicted in corresponding aerial image 204b. A gambrel roof 202a includes these features of the gable roof 202b but, as illustrated in aerial image 204a, the gambrel roof additionally includes a "skirt" region surrounding the central gable-shaped portion. The "skirt" region can be identified, in part, based upon its corner edges extending from the four corners of the gable-shaped portion. A hipped roof 202c, as shown in aerial image 204c, includes a central peak and two opposing triangular ends extending from either end of the central peak. The central peak forms a top edge of two trapezoidal sections. A square roof 202d, in contrast, has no central peak. Instead, as illustrated in aerial image 204d, the square roof includes four triangular portions meeting at a central point. Finally, a flat roof 202e, as shown in aerial image 204e, is represented by a substantially flat surface outlined by a rectangle.

Figure 2B:
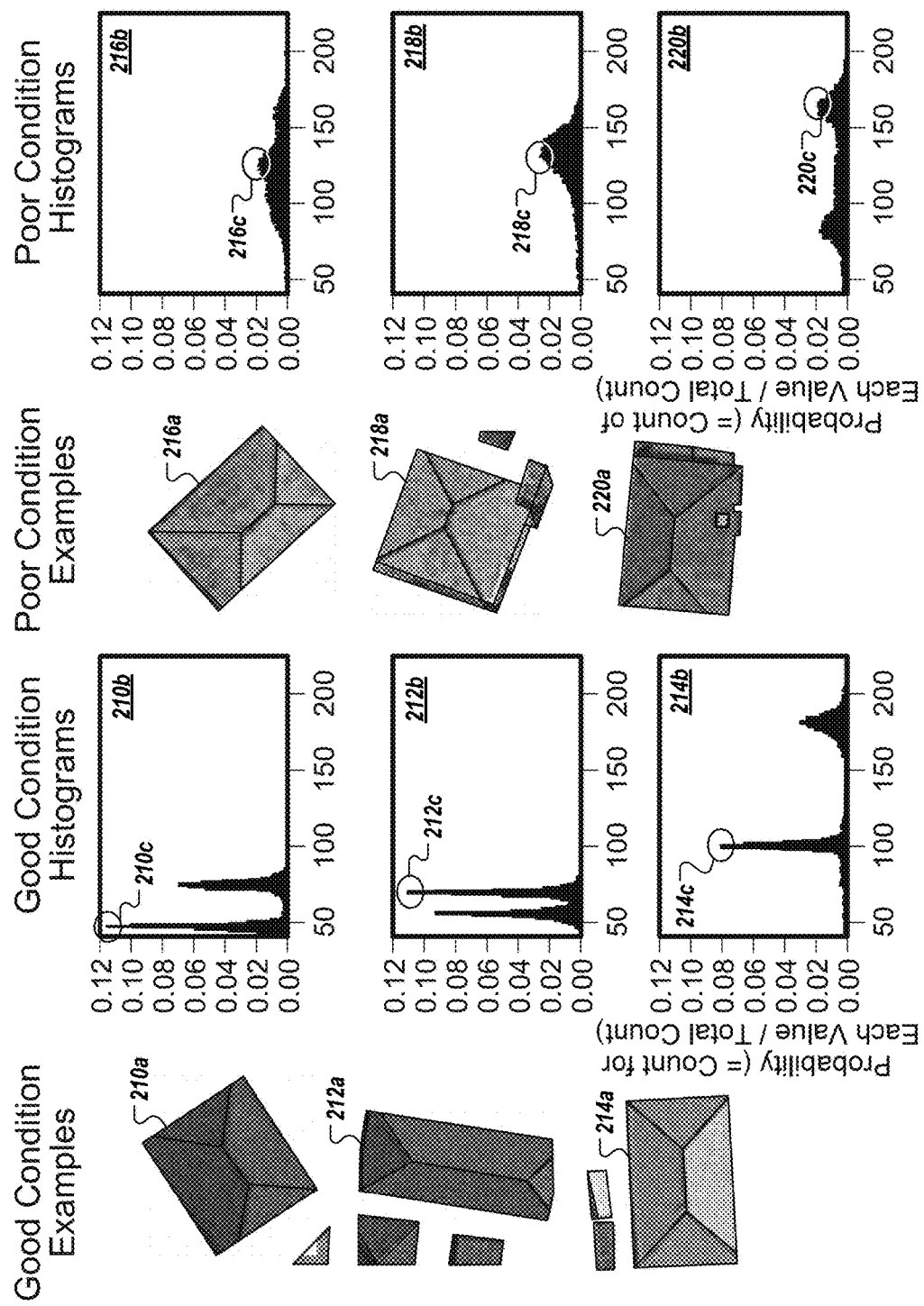
FIG. 2B illustrates examples of condition characteristics and corresponding example histograms.
Figure 2C:
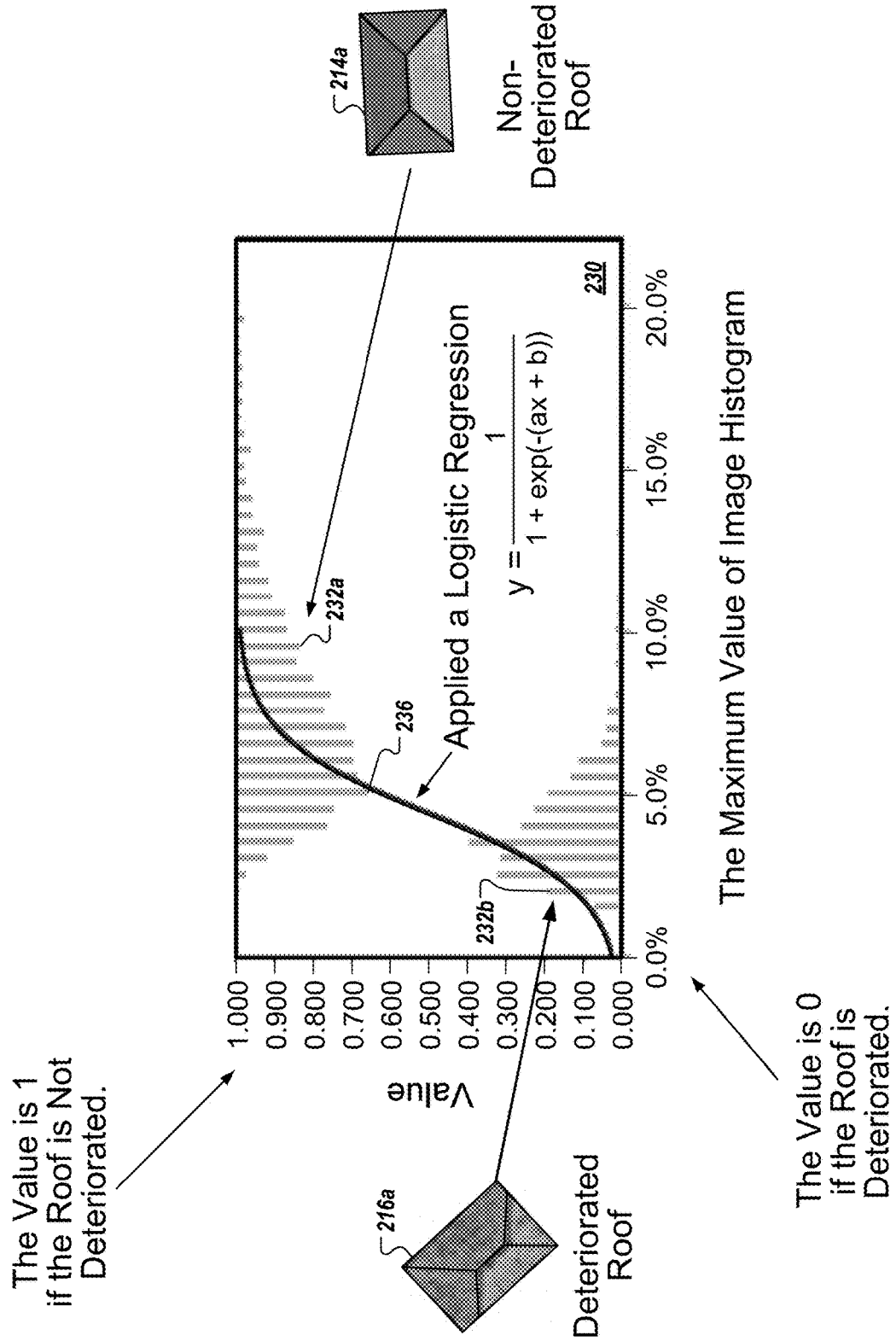
FIG. 2C illustrates an example condition profile corresponding to an example property characteristic type.
Figure 2D:
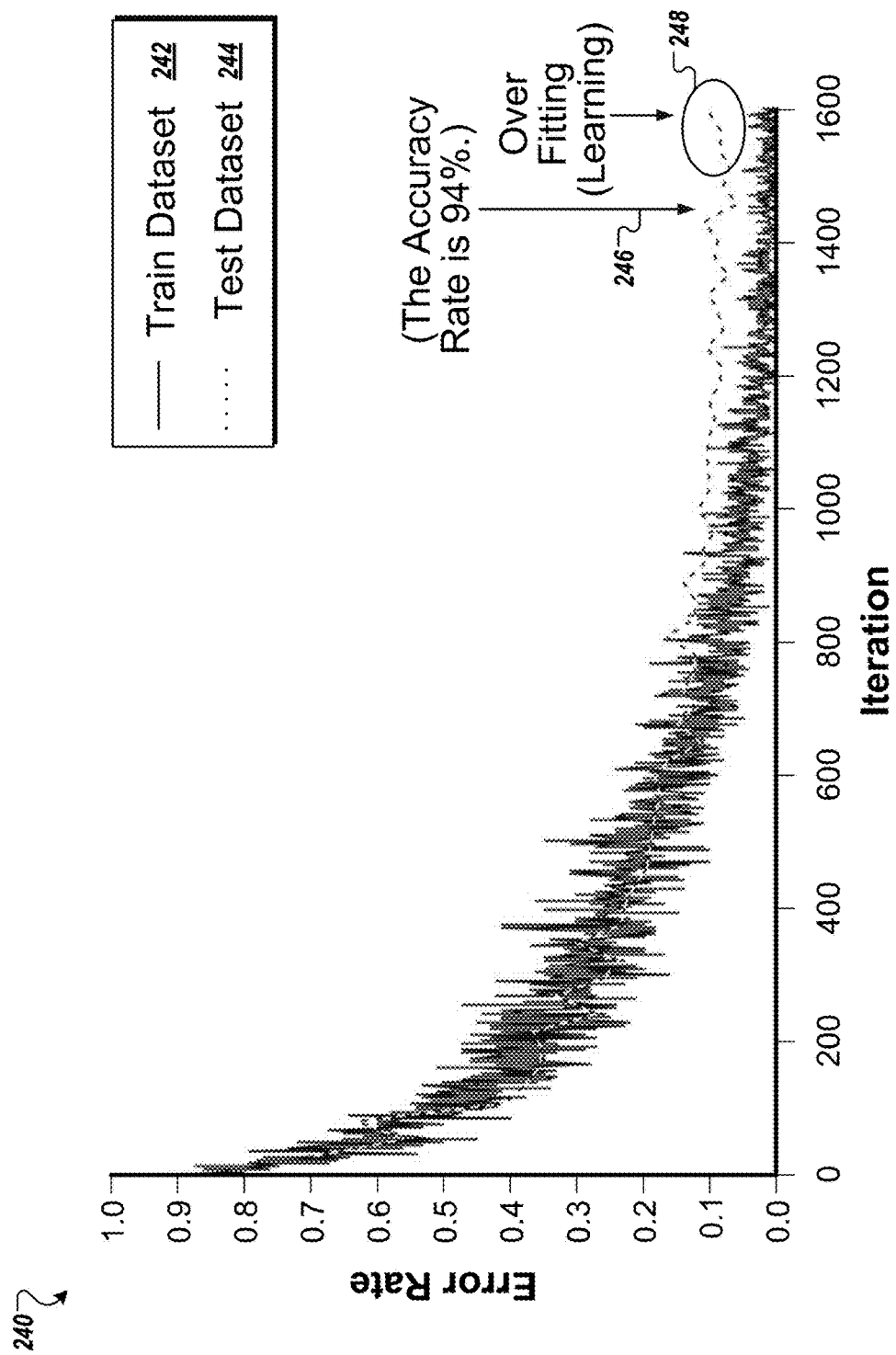
FIG. 2D is an example error rate graph comparing training data with test data in conducting matching aerial image features to corresponding rooftop shapes.

Turning to FIG. 2D, an example error rate graph 240 compares training data 242 with accuracy of matching test data 244 in matching aerial image rooftop characteristics to corresponding rooftop type (e.g., shape). A test was conducted using NIN deep learning algorithms to classify rooftop shape in two-dimensional aerial images including a mix of gambrel, gable, hipped, square, and flat roof shapes of assorted colors. Further tests involved differing image sizes and mini-batch sizes. In particular, images were scaled using a formula of $y=w*(x-100)+z$, where x represents a property size (e.g., building with a small border surrounding the area of the rooftop), y represents pixel size, w ranged from 0.33 to 0.40 and z ranged from 90 to 110. The error rates ranged, among initial test cases involving mini batches from 5 to 20, from about 4.3% to about 10%. As shown by the error rate graph 240, in a test situation involving 2,250 sample images in a training dataset and 250 test images in a test dataset, the minimum error rate in determining rooftop condition was 6%, corresponding to an accuracy rate of 94%.

To improve accuracy rate, in some implementations, the image can be cropped and/or resized prior to analyzing. For example, the image may be cropped to include the property of interest, or the property of interest plus a portion of its surroundings (e.g., the lot containing the property and/or a portion of the proximate neighborhood in which the property resides). Resizing to a standard image size, in another example, can contribute to accuracy improvement.

Further to roof shape, in some embodiments, feature analysis can be used to discern additional roof features such as, in some examples, roof covering, roof anchors, roof equipment, skylights, widow's walks, turrets, towers, dormers, and/or chimneys. Furthermore, upon identifying the outline of the roof, a footprint of the property location 102b (e.g., size of the roof) can be calculated based upon a scale of the aerial image 102c.

Returning to FIG. 1, rather than exclusively analyzing the particular property locations 102b individually, in some implementations, the particular property locations 102b are each classified based in part upon nearby structures. For example, based upon property location 102b dimensions, which may include lot dimensions, machine learning can be used to identify additional structures at the property location 102b such as, in some examples, a deck, swimming pool, shed, gazebo, detached garage, tennis court, fence, retaining wall, dock, playground equipment, or greenhouse. Further, the particular property locations 102b may be classified in part based upon distance from neighboring structures (pounding).

In some implementations, terrestrial images 102d may be used to classify features difficult to recognize using aerial imagery 102c. The terrestrial images 102d, in some examples, can include street view images obtained from a street view service or real estate listing. In some examples, street view images including a street-facing view of the property location 102b may be obtained from Google® Street View by Google, Inc., Bing® Maps Streetside by Microsoft Corp. of Redmond, Wash., or Mapillary by Mapillary AB of Sweden. Using a terrestrial image, for example, the system can identify features such as construction type, cladding, building height, number of soft stories, number of floors, location coordinates, street name, slope, elevation, year built, and/or occupancy type. Where the characteristics identifiable via the terrestrial imagery 102d overlap with characteristics identifiable via two-dimensional or three-dimensional aerial imagery 102c, analysis of terrestrial imagery 102d can be combined with analysis of aerial imagery 102c, in some embodiments, to increase confidence in identification of the particular characteristic(s). For example, house siding features may be more easily detected in terrestrial imagery 102d and/or three-dimensional aerial imagery 120c than in two-dimensional aerial imagery 102c.

In some implementations, a condition of each property feature may be classified (112) as a corresponding condition characteristic 116. New properties are in good condition, but property feature conditions can deteriorate over time due to normal wear-and-tear on the property. Further, property features can suffer damage due to external forces such as storms and natural disasters. Eventually, conditions of housing features can deteriorate to the point where repair and/or replacement may be necessary. As with property characteristics described above at block 106, machine learning algorithms can be used to classify a present condition of individual detected property features. Using machine learning for analysis, for example, the system can extract pixel intensity distributions of previously identified property features of the aerial image of the particular property location 102b. In some examples, newly constructed property features generally have sharp contrast and well-defined features in machine learning image analysis. Conversely, weathered or damaged property features can have softened edges, blurred contrasts, and asymmetrical patches of wear. The machine learning classifier used in the machine learning condition analysis, in some embodiments, includes a machine learning analysis to process the aerial image 102c of the particular property location 102b and to classify the condition of previously identified property characteristics 110 as condition characteristics 116. The machine learning analysis, in some examples, can include two-dimensional color histogram analysis or three-dimensional color histogram analysis. In other embodiments, the machine learning analysis may be performed using pattern recognition algorithms (e.g., determining missing fence posts or missing/ misaligned rooftop shingles). In other embodiments, the machine learning classifier includes deep learning analysis such as CNN or NIN.

In an illustrative example, turning to FIG. 2B, examples of condition characteristics of aerial images of hipped rooftops and corresponding example histograms generated through machine learning analysis of pixel intensity are presented. For example, a set of good condition aerial images 210a through 214a, are presented alongside corresponding good condition histograms 210b through 214b. The good condition histograms 210b through 214b, in an illustrative embodiment, illustrate probability metrics of grayscale color distribution, where a respective maximum value 210c through 214c demonstrates the peak probability of grayscale color distribution of a good condition roof. The values, for example, can range from 0 (total black) to 255 (total white).

Conversely, a set of poor condition aerial images 216a through 220a, are presented alongside corresponding poor condition histograms 216b through 220b. The poor condition histograms 216b through 220b, in an illustrative embodiment, illustrate probability metrics of grayscale color distribution, where a respective maximum value 216c through 220c demonstrates the peak probability of grayscale color distribution of a good condition roof. The maximum values 216c through 220c corresponding to the poor condition rooftops 216a through 220a are markedly lower than corresponding maximum values 210c through 214c of good condition rooftops 210a through 214a. In addition, a width of the distributions of the poor condition histograms 216b through 220b may be markedly wider than a width of the distributions of the good condition histograms 210b through 214b. As can be seen of the aerial images of the poor condition rooftops 216a through 220a, the color distribution is patchy and bleached out, while the edges of the rooftops have lost their crisp lines. Conversely, looking to the aerial images of the good condition rooftops 210a through 214a, the rooftops are more substantially uniform in color with crisp lines on the edges.

Turning to FIG. 2C, a condition profile 230 for a rooftop condition is illustrated. In some implementations, pixel value distribution histograms such as the histograms 210b through 220b, in some implementations, can be combined to generate an example condition profile 230 corresponding to rooftop condition. The condition profile 230, for example, may be included as one of the condition profiles 114 of FIG. 1. Example reference bars 232a, 232b on the condition profile 230 illustrate values corresponding to a non-deteriorated hipped roof 214a and the deteriorated hipped roof 216a, respectively. In some examples, the closer the value of a reference bar 232 comes to 1 on the Y-axis, the better the condition of the roof, while values close to 0 represent poor condition rooftops. In one example, the reference bars 232 of the example condition profile 230 correspond to a test conditions sample data set including 2,500 images). The reference bars 232 can be combined, in some embodiments, in a logistic regression to generate a roof condition profile graph 236. The accuracy rate of the image histogram is 80% based on some validation.

Although illustrated as a single condition profile 230 corresponding to different types of rooftops (e.g., at least the hipped rooftop 216a and the gable rooftop 234), in other embodiments, individual condition profiles 114 can be generated for each property characteristic (e.g., profiles specific to gabled, gambrel, flat, hipped, square, etc.). In further refinements, in certain embodiments, individual condition profiles 114 can be generated for combinations of property characteristics (e.g., a gabled, shingled roof, a gabled, clay tiled roof, a gabled, metal roof, etc.) to increase accuracy rate based upon pixel densities corresponding to the combined characteristics. Many combinations of characteristics of property features may be used singly or in combination to generate a condition profile 114 designed to accurately identify the condition of the corresponding property feature.

Returning to FIG. 1, in some implementations, the property characteristics 110 and/or condition characteristics 116 may be analyzed to calculate (120) a risk estimate 122 corresponding to a risk of damage based upon one or more types of disasters. The types of disasters can include, in some examples, earthquake, hurricane, tornado, storm surge, straight line winds, or explosion. The types and estimated severity of disasters, in some embodiments, may depend upon the particular property location 102b. For example, properties near active fault lines may be more susceptible to earthquakes, while coastal properties may be more susceptible to storm surge damage. The risk estimate 122, in some examples, can include an actuarial percentage indicating a likelihood of damage based upon the particular property characteristics. Different property characteristics, for example, may be more susceptible than others to certain types of damage. For example, flatter rooftops may be more susceptible to damage from excessive snow build-up, while peaked rooftops may be more vulnerable to strong winds.

In some embodiments, in calculating damage risk, one or more disaster risk profiles 118 can be applied based upon property characteristics. Vulnerability to damage due to disaster can vary, in some examples, by location, altitude, slope, rooftop shape, rooftop condition, cladding type, cladding condition, and/or pounding. In a particular example, as shown in FIG. 2A, a graphical risk profile 206 ranks types of rooftops by their vulnerability to strong winds. Vulnerability to wind damage increases from lowest vulnerability (flat rooftop 202e) to square roof 202d, to hipped roof 202c, to gable roof 202b, with the greatest wind damage vulnerability in gambrel roofs 202a. Vulnerability may be mathematically modeled based upon statistical information built from past damage results due to varying types and/or severity of disaster. In combining location-based vulnerabilities with individual property characteristic-based vulnerabilities, risk of damage due to disaster can be more accurately estimated.

Referring back to FIG. 1, the risk estimates 122, in some embodiments, can be used in insurance assessments. For example, the risk estimate 122 may be used in determining whether a property is adequately insured against potential damage. Further, when tracking an impending natural disaster, an insurance company may use the risk estimates 122 to estimate claims based upon the forecast path and severity of the storm. Additionally, the risk estimates 122 may be applied by investors when selecting investment properties for an investment portfolio.

In some implementations, repair or replacement costs can be calculated (126) to determine a cost estimate 128 to place one or more property characteristics in good or "like new" condition. The cost estimates 128, in some embodiments, can be based in part on one or more replacement cost profiles 120. Replacement costs, in some examples, may vary based upon type of materials (e.g., rooftop materials, cladding materials, etc.), size of the job (e.g., estimated area of the roof, estimated length of fence, etc.), and/or additional property characteristics (e.g., contributing to the complexity of the work). The replacement profiles 120, in further examples, may be based in part on location (e.g., varying costs of material and labor regionally). In some implementations, the cost estimates 128 for repair or replacement of the property characteristics may be output to a dashboard interface screen at a remote computing device of a requester, such as an insurance carrier or real estate investment broker.

In some embodiments, cost estimates 128 can be used in automatically analyzing insurance claims. The cost estimate 128, further, may be combined with the risk estimate 122 in analyzing adequacy of insurance coverage for a particular property location 102b. Further, the cost estimates 128 may be used by investors in determining cost of maintaining/upgrading a particular investment property.

Although the operational flow is illustrated as a series of computational stages, in other implementations, more or fewer computational stages may be included. For example, aerial imagery 102c may be analyzed after an insurance claim has been paid to verify that the insured property has been repaired and/or to upgrade the estimated value of the property (e.g., in the circumstance where the owner upgraded the property rather than applying a straight repair/replacement of the damaged property characteristics.

Additionally, in other implementations, certain computational stages may be performed in a different order. For example, cost estimates 128 may be calculated prior to risk estimates 122. Other modifications of the operational flow 100 are possible.

Figure 3:
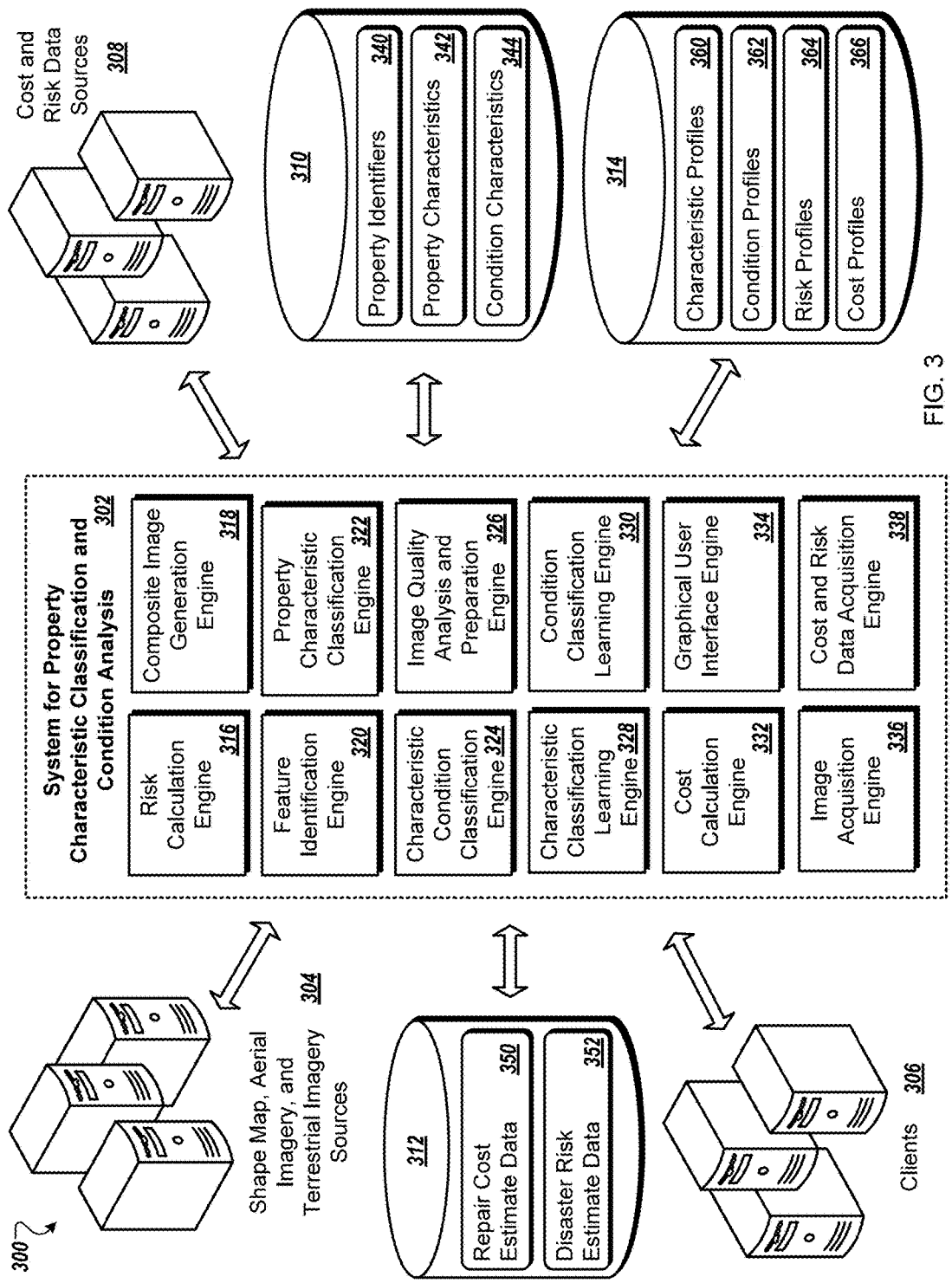
FIG. 3 is a block diagram of an example environment for matching aerial image topographical features to corresponding property maintenance levels.

FIG. 3 is a block diagram of an example environment 300 for matching aerial image topographical features to corresponding property maintenance levels. The example environment 300, for example, can be used to implement the operational flow 100 described in relation to FIG. 1. The example environment 300 includes a property characteristic classification and condition analysis system 302 in communication with client computing system(s) 306, a number of cost data and/or risk data source computing system(s) 308, and a number of shape map, aerial imagery, and/or terrestrial imagery source computing system(s) 304. The communication connection may be wired or wireless, over a variety of network types. In a general overview, the system 302 obtains property identifier(s) 340 from client computing system(s) 306, accesses images of a property identified by the property identifier 340 from the imagery source computing system(s) 304, and analyzes the images to determine property characteristic(s) 342 and condition characteristic(s) 344. Using cost and/or risk data obtained from cost and risk data source computing system(s) 308, the system 302 may determine replacement cost estimate data 350 and/or disaster risk estimate data 352 based upon the property characteristics and their condition.

In some implementations, a user of a particular client computing system 306 submits a request to the system 302 through a graphical user interface supplied by a graphical user interface engine 334. The request, for example, may include at least one property identifier 340 as well as one or more property characteristics 342 and/or identification of at least one of a replacement or repair cost estimate, a disaster risk estimate, and a confirmation of repair assessment. The property identifier 340, in some examples, may include location information (e.g., address, geolocation coordinates, lot boundaries, etc.). The location information, for example, may conform with property location information 102b described in relation to FIG. 1. In other embodiments, the property identifier 340 may be a unique property identifier (e.g., number or string) used to look up property location information in a data store 310. In another embodiment, rather than submitting a property identifier, the user may submit a unique user identifier used to look up one or more properties associated with the user (e.g., properties insured by an insurance client, properties held by an investment client, etc.).

In one example, turning to FIG. 8A, a user may identify locations of one or more properties by selecting the properties within a graphical map interface 800. A number of properties are identified within the map view user interface 800 as indicated with an associated pin, such as pin 804. The pins, in some examples, may indicate properties insured by a particular insurance carrier, a type of property (e.g., commercial, industrial, residential, etc.), and/or properties of a value range (e.g., within a range, above a threshold, etc.). The pins, for example, may be displayed based upon filtering options supplied by the user or otherwise associated with a user profile (e.g., insurance carrier identification). In a particular example, a user may select three properties associated with three dialogue bubbles 802. As illustrated, each dialogue bubble identifies a replacement value associated with the property, and invites the user to review details regarding the selected property via a details control.

Figure 8B:
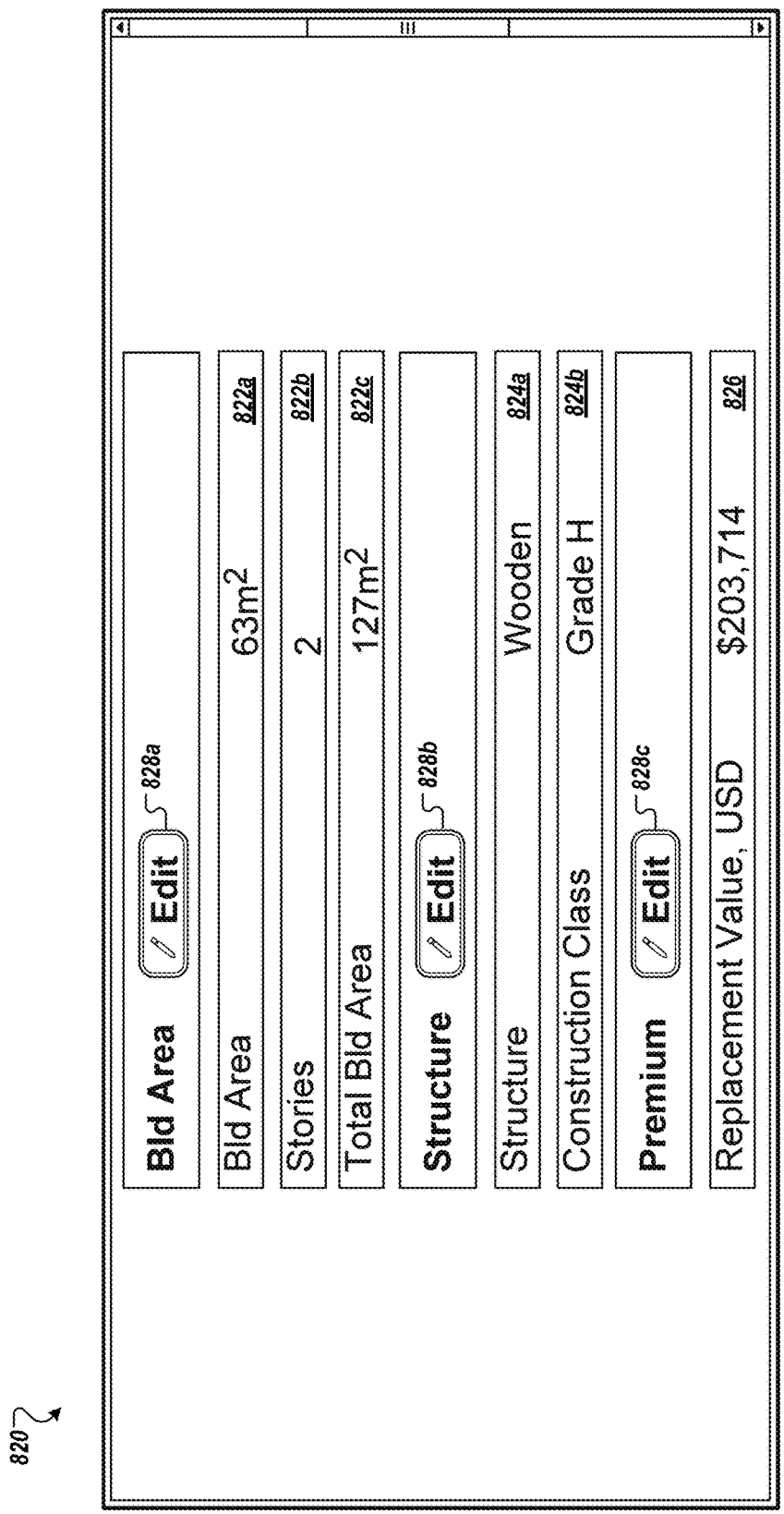

In some implementations, the user enters property characteristics associated with each selected property. In other implementations, the characteristics may be accessed upon identification of the property (e.g., selection of a pin identifying a property, as illustrated in FIG. 8A). For example, the property characteristics 342 may be obtained from the data store 310, as illustrated in FIG. 3. Turning to FIG. 8B, an example property characteristics user interface 820 presents building area characteristics 822 (e.g., building area 822a, stories 822b, and total building area 824c) and structure characteristics 824 (e.g., structure material 824a, construction class 824b). As described within, different or additional characteristics may vary per implementation. In some embodiments, the user may be provided the ability via the user interface 820 to edit the building area characteristics 822 and/or the structure characteristics 824, for example via an edit control 828a or 828b. For example, in the circumstance of recent development or renovation (e.g., construction of an addition), the user may modify previously stored characteristics values. The property characteristics user interface 820, for example, may be presented to a user upon selection of a details control of one of the dialogue bubbles 802 illustrated in the user interface of FIG. 8A.

The user interface 820 further presents, in some implementations, premium characteristics 826 such as a replacement value. The premium information, for example, may relate to an insurance policy purchased for the property or parameters for insuring the property (e.g., based upon upgraded or new characteristics). The user, in some embodiments, may be provided to update the premium information via an edit control 828c.

In some implementations, upon identification of property location information, the system 302 accesses imagery of the property from the imagery source computing system(s) 304 using an image acquisition engine 336. The images can include, in some examples, a shape map (e.g., such as the shape maps 102a described in relation to FIG. 1), two-dimensional aerial imagery (e.g., such as the aerial imagery 102c described in relation to FIG. 1), three-dimensional aerial imagery (e.g., such as the aerial imagery 102c described in relation to FIG. 1), and/or terrestrial imagery (e.g., such as the terrestrial imagery 102d described in relation to FIG. 1). The images obtained by the image acquisition engine 336, in some embodiments, depend upon the property characteristic(s) identified by the user. For example, certain types of images are preferred for analyzing certain types of property characteristics. Housing siding, for example, is more easily perceived from a terrestrial image or three-dimensional aerial image than from a two-dimensional aerial image.

In some implementations, an image quality analysis and preparation engine 326 analyzes the acquired image(s) to confirm the acquired image(s) contains an adequately clear and detailed image of the property identified by the property identifier 340. In some embodiments, the image quality analysis and preparation engine 326 crops and/or resizes the acquired image(s). For example, the image quality analysis and preparation engine 326 may extract a portion of an acquired image based upon the property (e.g., building size). In some implementations, the image quality analysis and preparation engine 326 resizes each acquired image to a standard size. The standard size, in a particular example, may be 256 by 256 pixels per image. Resizing to a standard size, for example, may increase accuracy in later classification analysis. The image quality analysis and preparation engine 326, in some embodiments, may be configured to apply corrections to the acquired image(s). For example, the image quality analysis and preparation engine 326 may be configured to adjust an aerial image from a normal orthophoto angle, to a true orthophoto version as described above.

In some implementations, the image quality analysis and preparation engine 326 uses shape outlines as part of the analysis. For example, a composite image generation engine 318 may overlay an aerial image with a shape map image, as described in relation to FIG. 5C. Using the resultant composite image, the image quality analysis and preparation engine 326 may confirm the aerial image conforms with an urban planning map or other property placement guide (e.g., navigational map data, etc.). Further, the image quality analysis and preparation engine 326 may use the overlaid shape map as a guide in determining whether an aerial image requires correction to a true orthophoto angle and/or how closely to crop the image to capture the property (and, optionally, its immediate surroundings such as its lot or a portion of the proximate neighborhood).

In some implementations, if the image quality analysis and preparation engine 326 determines that the acquired image is insufficient, the image quality analysis and preparation engine 326 may request a replacement image from the image acquisition engine 336. For example, the image acquisition engine 336 may obtain images based upon a variety of factors including, in some examples, recency of capture, resolution, cost, and/or applicability to a particular property characteristic analysis. Upon determination by the image quality analysis and preparation engine 326 that the first obtained image is insufficient, for example, the image acquisition engine 336 may determine a next best source for obtaining an image of the property.

In some implementations, once an image has been approved (and, optionally, prepared and/or corrected) by the image quality analysis and preparation engine 326, a feature identification engine 320 extracts features from the property image(s) related to the identified property characteristics 342. In the circumstance of a fence, for example, the feature identification engine 320 may identify a perimeter enclosure or partial perimeter enclosure abutting and extending from the property as indicative of a fence.

In some implementations, upon identification of features by the feature identification engine 320, a property characteristic classification engine 322 classifies the property characteristic. For example, the features may be classified using one or more machine learning techniques as described in relation to computational stage 106 (classify features of each image) of FIG. 1. The property characteristic classification engine 322, for example, may generate property characteristics 342 representing a grouping, type, or other characterization of a particular property feature. Continuing with the particular example of a fence, the extracted features may be analyzed and classified in relation to height and/or material. Upon classifying the property characteristics, the property characteristic classifications may be stored in the data store 310 as property characteristics 342 (e.g., similar to property characteristics 110 of FIG. 1).

In some implementations, the property characteristic classification engine 322 uses characteristic profile(s) 360 in classifying property characteristics. The property characteristic classification engine 322, for example, may obtain, for each property characteristic being analyzed, a particular characteristic profile 360 from a profile data store 314. The characteristic profiles, for example, may be similar to the characteristic profiles 108 described in relation to FIG. 1.

In some implementations, the property characteristic profiles 360 are generated by a characteristic classification learning engine 328. The characteristic classification learning engine 328, for example, may generate characteristic profiles 360 through a sample data set and learning process as described, generally, in relation to FIG. 2A. In a particular example, the characteristic classification learning engine 328 may analyze JPG (lossy compression digital image standard developed by the Joint Photographic Experts Group) to recognize varying rooftop shapes.

While certain property characteristic classifications are done by analysis, in some implementations, one or more feature classifications may be obtained from previously stored property characteristics 342. For example, based upon tax records, real estate records, etc. some basic materials and structure information regarding a property may be readily available through local and/or remote database system(s). In other examples, the previously stored property characteristics 342 may also be obtained from previous condition assessments performed for a property location by the system 302.

In some implementations, once the property characteristic classification engine 322 has classified the property characteristic(s), a characteristic condition classification engine 324 classifies the condition of each property characteristic. For example, the property characteristics may be classified as described in relation to computational stage 112 (classify condition of each feature) of FIG. 1. The characteristic condition classification engine 324, for example, may generate condition characteristics 344 representing a rating, qualification, or ranking of the condition of the particular characteristic. In some examples, the characteristic condition classification engine 324 may qualify a characteristic as a) "good" or "bad", b) "like new", "acceptable", "needs repair", or "needs replacement", c) rated on a numeric scale such as a scale from 1 to 5 where 5 may correspond to "like new" and 1 may correspond to "needs replacement." In other implementations, particular problems may be identified by the characteristic condition classification engine 324 such as, in some examples, a fence feature is partially fallen, or a roof feature shows signs of structural damage.

In some implementations, the characteristic condition classification engine 324 uses condition profile(s) 362 in classifying property characteristic conditions. The characteristic condition classification engine 324, for example, may obtain, for each property characteristic being analyzed, a particular condition profile 362 from the profile data store 314. The condition profiles 362, for example, may be similar to the condition profiles 114 described in relation to FIG. 1.

In some implementations, the condition profiles 362 are generated by a condition classification learning engine 330. The condition classification learning engine 330, for example, may generate condition profiles 362 through a sample data set and learning process as described, generally, in relation to FIG. 2B. In a particular example, color histogram analysis may be used to identify peak pixel values of the images in gray scale. Using the group of calculated peak pixel values, the learning engine can classify property condition into certain categories.

In some implementations, based upon the output of the property characteristic classification engine 322 and/or the characteristic condition classification engine 324, a risk calculation engine 316 may estimate risk of damage based upon one or more types of disaster. For example, the disaster risk estimate data 352 may be calculated as described in relation to computational stage 120 (calculate damage risk) of FIG. 1. The disaster risk estimate data 350, in one example, can include a percentage likelihood of damage due to each particular type of risk based upon the particular property characteristics and/or property conditions, as described in relation to the risk estimates 122 of FIG. 1. Further, in some embodiments, the disaster risk estimate data 350 may include a set of risk estimates based upon, in some examples, a number of severities of disaster, a particular path of disaster, and/or hazard intensity of disaster. The disaster severities, in some examples, may correspond to the Richter scale of seismic activity magnitude or the Saffir-Simpson Hurricane Wind Scale category. The path of the disaster, in some examples, can include geographical direction such as northeasterly, etc. or angle of impact with respect to the property characteristic(s). The hazard intensity of disaster, in some examples, can relate to wind speed or rainfall amount. Repair costs, for example, may be more accurately estimated when the roof condition is known. Due to poor condition of a rooftop in one particular example, the roof may be more vulnerable to damage requiring replacement. In another particular example, due to a poor condition rooftop, the likelihood for interior property damage (e.g., water damage due to breach of the roof) may increase at a set level of severity of disaster and above.

In some embodiments, the risk calculation engine 316 accesses one or more risk profiles 364 from the data store 314 based upon property characteristics and/or condition characteristics. The risk profiles, for example, may be similar to the disaster risk profiles 118 described in relation to FIG. 1. The risk profiles 364, for example, may be obtained from one or more risk data sources 306 by a cost and risk data acquisition engine 338. In other embodiments, the system 302 may generate risk profiles 364 (e.g., using risk data obtained from one or more cost and risk data sources 306 and a risk data analysis engine (not illustrated)).

The risk estimate data 352, in some embodiments, is shared with one or more clients 306. For example, an insurance carrier client 306 may use risk estimate data in making insurance assessments. In another example, a real estate investment broker or firm client 306 may apply risk estimate data 352 when selecting investment properties for an investment portfolio.

Figure 8C:
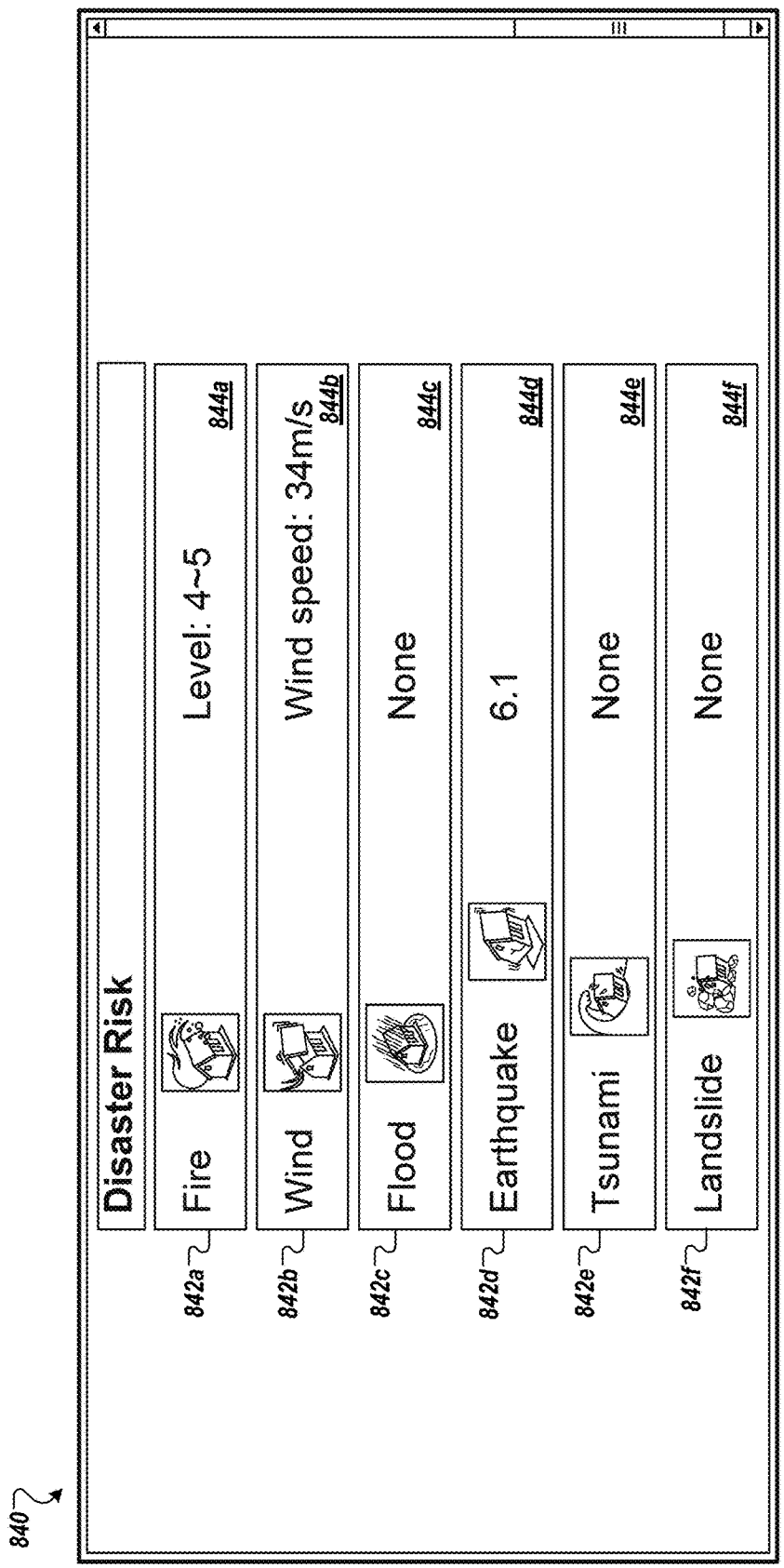

Turning to FIG. 8C, an example disaster risk user interface 840 presents risk assessment information based upon risk profiles 364 related to the selected property (e.g., one of the properties identified via the dialogue bubbles 802c of FIG. 8A). The user interface 840, for example, may be accessed by scrolling downward from the user interface 820. The user interface 840 illustrates a number of disaster risk factors 842 and associated risk estimate data 844 for the selected property. As illustrated, the disaster risk factors 842 include a fire factor 842a, a wind factor 842b, a flood factor 842c, an earthquake factor 842d, a tsunami factor 842e, and a landslide factor 842f. In some embodiments, only a subset of the risk estimate data is determined via risk assessment techniques described herein. For example, flood data 844c may be generated based upon governmental flood map evaluation rather than via aerial imaging assessment, while fire risk 844a may be determined at least in part based upon proximity to neighboring properties as derived via imaging analysis and/or construction properties derived via image analysis. Further, wind risk data 842b may be derived via rooftop analysis as described in greater detail herein.

In some implementations, based upon the output of the property characteristic classification engine 322 and/or the characteristic condition classification engine 324, a cost calculation engine 336 calculates repair or replacement costs for improving problems identified by the characteristic condition classification engine 324 and generates replacement cost estimate data 350. For example, the replacement cost estimate data 352 may be calculated as described in relation to computational stage 126 (calculate repair or replacement costs) of FIG. 1. The replacement cost estimate data 350, for example, may be similar to the cost estimates 128 described in relation to FIG. 1.

In some implementations, the cost calculation engine 336 based calculations in part on one or more cost profiles 366 (e.g., similar to the cost profiles 120 of FIG. 1). In some embodiments, the cost calculation engine 336 accesses one or more cost profiles 366 from the data store 314 based upon property characteristics and/or condition characteristics. The cost profiles 366, in some embodiments, are obtained from one or more cost data sources 306 by the cost and risk data acquisition engine 338. In other embodiments, the system 302 may generate cost profiles 366 (e.g., by a cost data analysis engine (not illustrated) using cost data obtained from one or more cost and risk data sources 306).

The cost estimate data 350, in some embodiments, is shared with one or more clients 306. For example, an insurance carrier client 306 may use cost estimate data in determining adequacy of insurance coverage for a particular property. In another example, a real estate investment broker or real estate investment firm client 306 may apply cost estimate data 350 in determining cost of maintaining/upgrading a particular investment property.

In some implementations, the cost estimate data 350 and/or risk estimate data 352 is provided to a requesting client 306, responsive to receiving identification of one or more properties, in real-time or near real-time. For example, a client 306 accessing a dashboard interface, may format a request for a risk estimate or cost estimate related to an identified property within a dashboard interface and submit the request via a network to the system 302. Responsive to the request, the system 302 may conduct the analysis described generally above and respond, in real time or near-real time to the client 306 with a risk analysis or cost analysis. For example, risk analysis information is presented in user interface 840 of FIG. 8C.

In some implementations, the system may identify, through updated meteorological data, one or more properties within a client real estate portfolio affected by a disaster. The system, further to identification of the affected properties, may proactively prepare a repair estimate to provide to the client corresponding to the real estate portfolio shortly after the disaster took effect. In one example, the Japan Meteorological Agency may update observation data via a web site interface within an hour or so of observation. In this example, the system may provide repair cost estimates to clients between one and two hours after a disaster has taken place.

Rather than sharing cost estimate data 350 and/or risk estimate data 352 directly with the clients 306, in other embodiments, the system 302 may include a report generation engine (not illustrated) that prepares reports regarding condition, damage, and risk assessments of one or more properties. Further, in some embodiments, the system 302 may compare a current condition characteristic 344 to a historic condition characteristic 344 to confirm whether a property owner made repairs to a property (e.g., based upon payment of an insurance claim). Other modifications of the system 302 are possible.

Figure 4:
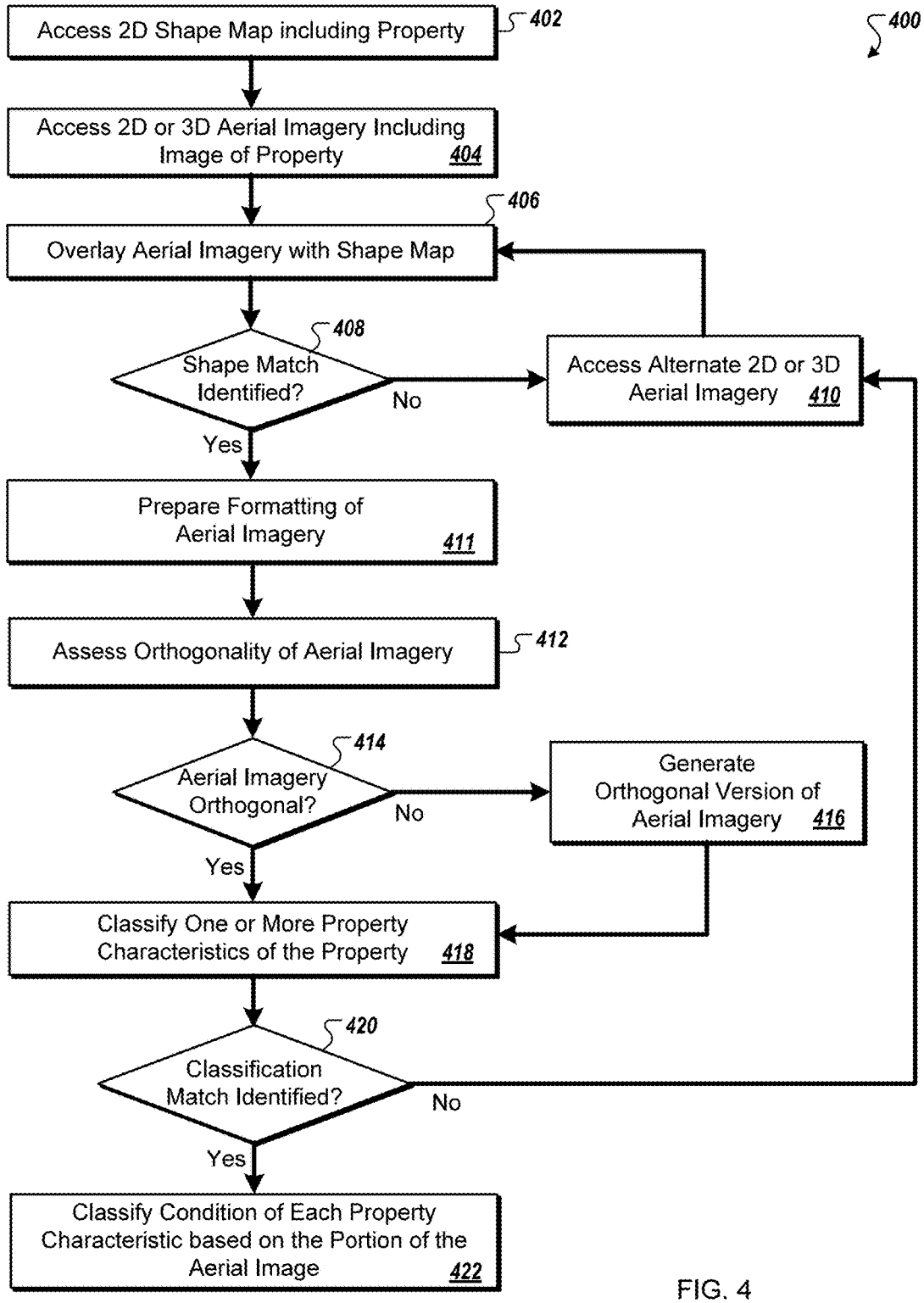
FIG. 4 is a flow chart of an example method for classifying condition characteristics of a property based on aerial image analysis.

FIG. 4 is a flow chart of an example method 400 for classifying condition characteristics of a property based on aerial image analysis. The flow chart, for example, may represent computational stages 104 through 112 as described in relation to FIG. 1. The method 400 may be performed, for example, by the system 302 of FIG. 3.

In some implementations, the method 400 begins with accessing a two-dimensional shape map including the shape of a property (402). The shape map, for example, may be accessed by the image acquisition engine 336 from a shape map imagery source 304, as described in relation to FIG. 3. The two-dimensional shape map, for example, may take a form of any of the shape maps 102a described in relation to FIG. 1. In a particular example, the shape map may be in a form similar to the shape map 500 described in relation to FIG. 5A.

In some implementations, two-dimensional and/or three-dimensional aerial imagery including an image of the property is accessed (404). The two-dimensional and/or three-dimensional aerial imagery, for example, may be accessed by the image acquisition engine 336 from an aerial imagery source 304, as described in relation to FIG. 3. The two-dimensional and/or three-dimensional aerial imagery, for example, may take a form of any of the aerial imagery 102c described in relation to FIG. 1. In a particular example, the two-dimensional aerial imagery may be in a form similar to the aerial image 510 described in relation to FIG. 5B.

In some implementations, the aerial imagery is overlaid with the shape map (406). The composite image generation engine 318 of FIG. 3, for example, may overlay the aerial imagery with the shape map to generate a composite image. The composite image, for example, may be in a form similar to the composite image 520 described in relation to FIG. 5C.

If a shape match is not identified (408), in some implementations, the method 400 accesses alternate two-dimensional or three-dimensional aerial imagery (410). In some embodiments, the image quality analysis and preparation engine 326 of FIG. 3 determines whether the composite image presents an adequate shape match of the property(s) of interest. Upon determining the image does not match, the image acquisition engine 336 of FIG. 3, for example, may obtain an alternative two-dimensional or three-dimensional aerial image from the aerial imagery source(s) 304. As described in relation to FIG. 3, for example, For the image acquisition engine 336 may determine a next best source for obtaining an image of the property based upon one or more factors. Conversely, the method 400, in other implementations (not illustrated), could proceed without matching the shape map to the aerial imagery.

If a shape match is identified (408), in some implementations, the formatting of the aerial imagery is prepared (411). In some embodiments, the image is cropped to include the property of interest or the property of interest plus a portion of its surroundings (e.g., the lot containing the property and/or a portion of the proximate neighborhood in which the property resides). Cropping may be based, for example, on the correlation of the shape map to the property. In illustration, the image may be cropped to include the shape map outline of the property plus a border region. In some embodiments, cropping may include cropping to a set shape (e.g., X by X pixels square, X by Y pixels rectangle, etc.). In some embodiments, in addition to cropping the image, the image may be resized. For example, depending upon the resolution of the aerial imagery, the image resolution may be reduced, for example, to fit within an X by X pixels square or an X by Y pixels rectangle. Resizing to a standard image size, for example, can contribute to analysis consistency and improvement in classification accuracy. In further embodiments, the color depth and/or color mapping of the aerial imagery may be adjusted. For consistent color histogram analysis of the imagery, for example, the color depth and color mapping may be made consistent across analyzed images. In a particular example, color images may be converted to grayscale for grayscale image analysis. Adjustments to the imagery, for example, may be effected by the image quality analysis and preparation engine 326, described in relation to FIG. 3.

In some implementations, orthogonality of the aerial imagery is assessed (412). For example, the image quality analysis and preparation engine 326 may assess orthogonality of the aerial imagery. The image quality analysis and preparation engine 326, in one example, may determine that orthogonality correction is desired. In another example, if the image represents a normal orthophoto rather than a true orthophoto, the image quality analysis and preparation engine 326 may notify further modules which may compensate for the angle of capture of the aerial image. In other implementations (not illustrated), orthogonality may be assessed without use of an overlaid shape map.

Returning to FIG. 4, in some implementations, if the aerial imagery is not orthogonal (414), an orthogonal version of the aerial imagery is generated (416). The image quality analysis and preparation engine 326 of FIG. 3, for example, may correct a normal orthophoto form to generate a true orthophoto form. The true orthophoto form, for example, may better match the shape map overly.

In some implementations, one or more property characteristics of the property are classified (418). The property, in some embodiments, is analyzed based on the portion of the aerial image substantially bounded by the shape map of the property. In other embodiments, the property analysis encompasses a surrounding of the property (e.g., features proximate the property upon the property lot, nearby properties, etc.). The property characteristic(s), for example, may be classified by the property characteristic classification engine 322, as described in relation to FIG. 3. In a particular example, a rooftop property feature may be classified as one of a variety of rooftop shapes, as illustrated in FIG. 2A.

In some implementations, if a property characteristic classification is identified (420), a condition of each of the property characteristics can be classified (422). The property characteristic condition(s), for example, may be classified by the characteristic condition classification engine 324, as described in relation to FIG. 3. In a particular example, a hipped classification of the rooftop feature may be classified as one of a good condition and a poor condition, as illustrated in FIG. 2B. In some implementations, the classifications of the condition of each of the property characteristics may by output to a computing device of a requester (424) via a dashboard interface screen. In some examples, in addition to providing the condition classification for the property characteristics, the dashboard interface screen may include replacement costs for replacing the property characteristics, risk cost estimates due to damage from natural disasters, or confirmation of whether or not repairs have been made to the property characteristics.

If, instead, a classification match was not identified (420), in some implementations, alternate two-dimensional or three-dimensional aerial imagery is accessed (410) and the method 400 restarts with overlaying the replacement aerial imagery with the shape map (406). Alternatively, in some embodiments, even if a classification match is not identified, condition may be assessed based upon a default profile associated with the property feature (not illustrated). For example, if the rooftop shape does not match one of the shapes trained into the system, the condition of the rooftop may still be assessed based upon a general condition profile trained with a variety of rooftop shapes. In some examples, the condition of the rooftop may be assessed by comparing the current rooftop conditions to stored historic condition characteristics for the property from a previous condition assessment.

Although the method 400 is illustrated as a series of steps, in other implementations, more or fewer steps may be included. For example, in some implementations, terrestrial images are obtained and used to classify the same and/or different property characteristics, as described in relation to the operational flow 100 of FIG. 1.

Additionally, in other implementations, certain steps may be performed in a different order. For example, in some implementations, property characteristics and condition characteristics may be classified (418, 422) in parallel. Other modifications of the operational flow 100 are possible.

Aspects of the present disclosure may be directed to computing systems for categorizing a repair condition of a property characteristic in order to provide dynamic, real-time property condition assessments in response to requests received from users such as insurance carriers or real estate investment brokers using aerial imagery. The implementations described herein improve upon conventional methodologies by applying deep learning analysis models to detected property characteristics of the obtained imagery in order to assess whether a condition of the property characteristics is degraded to a point of needing repair or replacement and determine an amount of risk exposure of the property due to the detected condition of the property characteristics. The implementations described herein improve processing efficiency of the system to reduce an amount of time it takes to perform the condition assessments and automate a condition assessment process.

Figure 6:
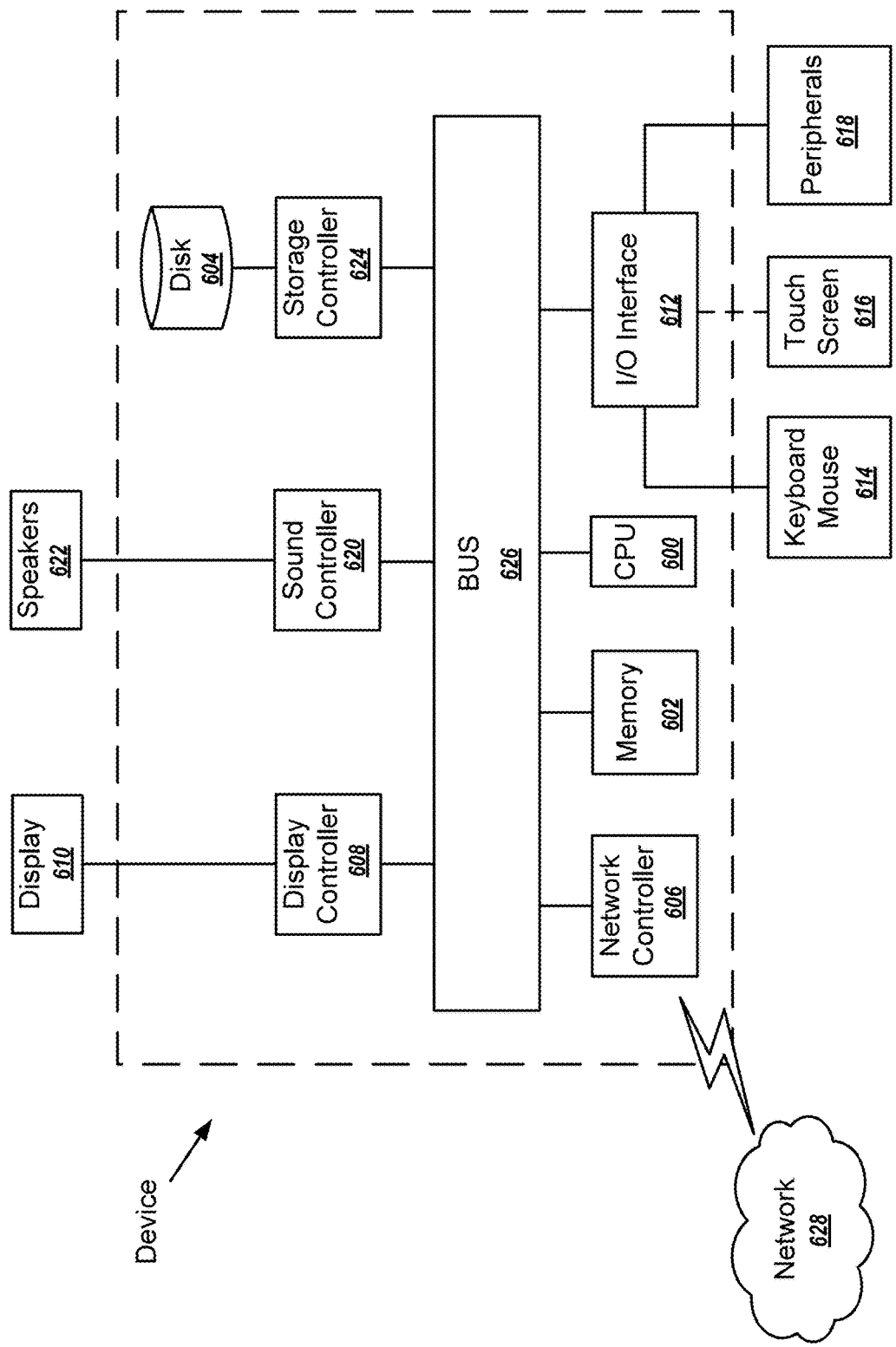
FIG. 6 is a block diagram of an example computing system.

Next, a hardware description of the computing device, mobile computing device, or server according to exemplary embodiments is described with reference to FIG. 6. In FIG. 6, the computing device, mobile computing device, or server includes a CPU 600 which performs the processes described above. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 600 and an operating system such as Microsoft Windows 6, UNIX, Solaris, LINUX, Apple MAC-OS and other systems known to those skilled in the art.

CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The computing device, mobile computing device, or server in FIG. 6 also includes a network controller 606, such as an Intel Ethernet PRO network interface card from Intel Corporation of America, for interfacing with network 6X. As can be appreciated, the network 628 can be a public network, such as the Internet, or a private network such as an LAN or WAN network, or any combination thereof and can also include PSTN or ISDN sub-networks. The network 628 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device, mobile computing device, or server further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device, mobile computing device, or server, such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the computing device, mobile computing device, or server. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, where the processors are distributed across multiple components communicating in a network. The distributed components may include one or more client and server machines, which may share processing, as shown on FIG. 8, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Figure 7:
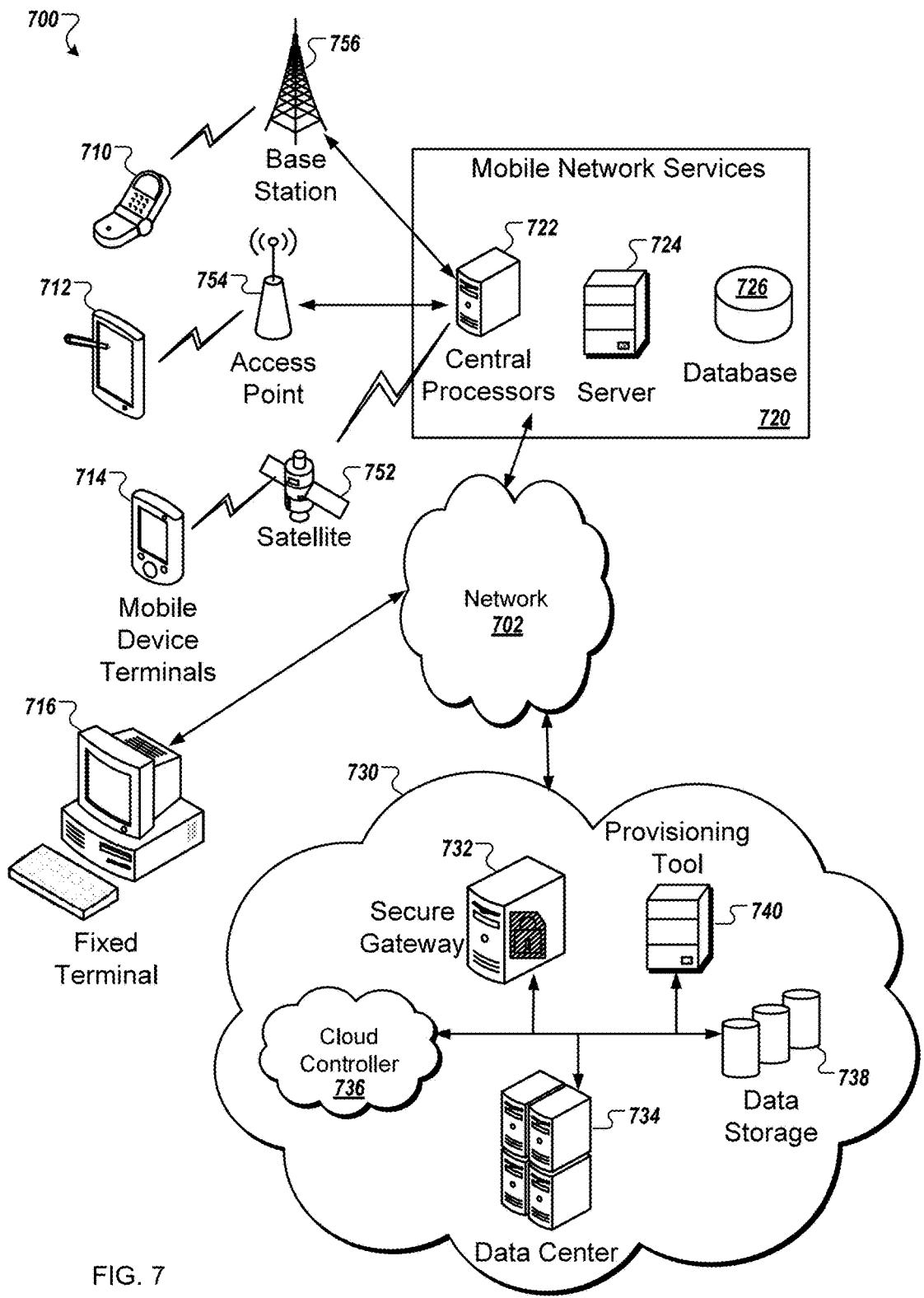
FIG. 7 is a block diagram of an example distributing computing environment including a cloud computing environment.

In some implementations, as illustrated in FIG. 7, the innovations described herein may interface with a cloud computing environment 730, such as Google Cloud Platform™ to perform at least portions of methods or algorithms detailed above. The processes associated with the methods described herein can be executed on a computation processor, such as the Google Compute Engine by data center 734. The data center 734, for example, can also include an application processor, such as the Google App Engine, that can be used as the interface with the systems described herein to receive data and output corresponding information. The cloud computing environment 730 may also include one or more databases 738 or other data storage, such as cloud storage and a query database. In some implementations, the cloud storage database 738, such as the Google Cloud Storage, may store processed and unprocessed data supplied by systems described herein.

The systems described herein may communicate with the cloud computing environment 730 through a secure gateway 732. In some implementations, the secure gateway 732 includes a database querying interface, such as the Google BigQuery platform.

The cloud computing environment 102 may include a provisioning tool 740 for resource management. The provisioning tool 740 may be connected to the computing devices of a data center 734 to facilitate the provision of computing resources of the data center 734. The provisioning tool 740 may receive a request for a computing resource via the secure gateway 732 or a cloud controller 736. The provisioning tool 740 may facilitate a connection to a particular computing device of the data center 734.

A network 702 represents one or more networks, such as the Internet, connecting the cloud environment 730 to a number of client devices such as, in some examples, a cellular telephone 710, a tablet computer 712, a mobile computing device 714, and a desktop computing device 716. The network 702 can also communicate via wireless networks using a variety of mobile network services 720 such as Wi-Fi, Bluetooth, cellular networks including EDGE, 3G and 4G wireless cellular systems, or any other wireless form of communication that is known. In some embodiments, the network 702 is agnostic to local interfaces and networks associated with the client devices to allow for integration of the local interfaces and networks configured to perform the processes described herein.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for automatically categorizing a repair condition of a property characteristic, comprising:
receiving, from a user at a remote computing device, a request for a property condition classification, wherein the property classification request includes identification of a property and at least one property characteristic;
obtaining, by processing circuitry of a computing system responsive to receiving the request, an aerial image of a geographic region including the property;
extracting, by the processing circuitry, one or more of a plurality of features from the aerial image corresponding to the property characteristic, wherein the extracted features include pixel groupings representing the property characteristic;
determining, by the processing circuitry from the extracted features, a property characteristic classification for the property characteristic, wherein determining the property characteristic classification includes applying the pixel groupings for the property characteristic to a first machine learning classifier trained to identify property characteristics from a set of pixel groupings;
determining, by the processing circuitry based on the identified property characteristic and the extracted features, a condition classification for the property characteristic, wherein identifying the condition classification includes applying the pixel groupings for the property characteristic to a second machine learning classifier trained to identify property characteristic conditions from a set of pixel groupings;
determining, by the processing circuitry based in part on the property characteristic classification and the condition classification, a risk estimate of damage to the property due to one or more disasters; and
returning, to the user at the remote computing device via a graphical user interface responsive to receiving the request, a condition assessment of the property characteristic including the condition classification and the risk estimate of damage to the property due to the one or more disasters.

2. The method of claim 1, wherein the property characteristic classification is rooftop shape.

3. The method of claim 2, wherein the first machine learning classifier is trained with a set of aerial training images having known rooftop shapes such that the machine learning classifier is configured to determine the rooftop shape from a plurality of rooftop shapes.

4. The method of claim 1, wherein at least one of the first machine learning classifier and the second machine learning classifier is a Network in Network (NIN) classifier.

5. The method of claim 1, wherein determining the risk estimate comprises applying a disaster risk profile corresponding to a) a first disaster of the at least one disaster and b) the property characteristic.

6. The method of claim 1, wherein the pixel groupings comprise at least one of angles, outlines, and substantially homogenous pixel fields defining the property characteristic.

7. The method of claim 1, wherein identifying the condition classification for the property characteristic comprises:
generating, from the pixel groupings, a pixel intensity distribution of the property characteristic; and
determining, by applying the second machine learning classifier, the condition classification based on the pixel intensity distribution of the property characteristic.

8. A system for automatically categorizing a repair condition of a property characteristic, comprising:
processing circuitry; and
a non-transitory computer-readable medium having instructions stored thereon;
wherein the instructions, when executed by the processing circuitry, cause the processing circuitry to
receive, from a user at a remote computing device, a property condition classification request, wherein the property classification request includes identification of a property and at least one property characteristic;
obtain, from a remote data source responsive to receiving the property classification request, an aerial image of a geographic region including the property;
extract one or more of a plurality of features from the aerial image corresponding to the property characteristic, wherein the extracted features include pixel groupings representing the property characteristic;
determine, from the extracted features, a property characteristic classification, wherein determining the property characteristic classification includes applying the pixel groupings for the property characteristic to a first machine learning classifier trained to identify property characteristics from a set of pixel groupings;
determine, based on the identified property characteristic and the extracted features, a condition classification for the property characteristic, wherein identifying the condition classification includes applying the pixel groupings for the property characteristic to a second machine learning classifier trained to identify property characteristic conditions from a set of pixel groupings; and
determine, in real-time responsive to receiving the property classification request and using the property characteristic classification and the condition classification, a replacement cost for replacing the property characteristic.

9. The system of claim 8, wherein the instructions, when executed by the processing circuitry, cause the processing circuitry to, prior to identifying the one or more of the plurality of features:
obtain a shape map image including the property;
overlay the aerial image with the shape map image; and
determine whether a boundary of the property as identified by the shape map matches a boundary of the property as illustrated in the aerial image.

10. The system of claim 9, wherein the instructions, when executed by the processing circuitry, cause the processing circuitry to, upon determining that the shape map does not match the boundary of the corresponding property, obtain an alternate aerial image of the property.

11. The system of claim 8, wherein the instructions, when executed by the processing circuitry, cause the processing circuitry to compare a current condition classification of the property characteristic to a stored historic condition classification of the property characteristic.

12. The system of claim 11, wherein the instructions, when executed by the processing circuitry, cause the processing circuitry to, in real-time responsive to receiving the property condition classification request, determine whether repairs have been made to the property based on the comparison of the current condition classification to the historic condition classification of the property characteristic.

13. The system of claim 8, wherein the instructions, when executed by the processing circuitry, cause the processing circuitry to, prior to identifying the one or more of the plurality of features, assess orthogonality of the aerial imagery.

14. The system of claim 13, wherein the instructions, when executed by the processing circuitry, cause the processing circuitry to, responsive to assessing that the orthogonality of the aerial imagery does not correspond to a true orthophoto form, cause correction of the aerial imagery to the true orthophoto form.

15. A non-transitory computer readable medium having instructions stored thereon, wherein the instructions, when executed by processing circuitry, cause the processing circuitry to:
receive, from a user at a remote computing device, a property condition classification request, wherein the property classification request includes identification of a property and at least one property characteristic;
obtain, from a remote data source responsive to receiving the property classification request, an aerial image of a geographic region including the property;
extract from one or more of a plurality of features from the aerial image corresponding to each property characteristic of the at least one property characteristic, wherein the extracted features include pixel groupings representing the respective property characteristic;
for each of the at least one property characteristic,
determine, from the extracted features for the respective property characteristic, a respective property characteristic classification, wherein determining the respective property characteristic classification includes applying the pixel groupings for the respective property characteristic to a first machine learning classifier trained to identify property characteristics from a set of pixel groupings, and
determine, based on the respective identified property characteristic and the respective extracted features, a respective condition classification for the respective property characteristic, wherein identifying the respective condition classification includes applying the respective pixel groupings for the respective property characteristic to a second machine learning classifier trained to identify property characteristic conditions from a set of pixel groupings; and
determine, in real-time responsive to receiving the property classification request and using the property characteristic classification of each property characteristic and the condition classification of each property characteristic, at least one risk estimate representing risk of damage due to disaster.

16. The non-transitory computer readable medium of claim 15, wherein the instructions, when executed by the processing circuitry, cause the processing circuitry to, prior to obtaining the aerial image of the geographic region, determine, based upon the at least one property characteristic, a preferred image type corresponding to each property characteristic of the at least one property characteristic.

17. The non-transitory computer readable medium of claim 16, wherein:
the at least one property characteristic comprises two or more property characteristics; and
the instructions, when executed by the processing circuitry, cause the processing circuitry to, responsive to determining the preferred image type corresponding to a first property characteristic of the at least one property characteristic is a terrestrial image, obtain a terrestrial image of the geographic region including the property.

18. The non-transitory computer readable medium of claim 15, wherein the instructions, when executed by the processing circuitry, cause the processing circuitry to access one or more known property characteristics, wherein determining the at least one risk estimate comprises determining the at least one risk estimate further based on the one or more known property characteristics.

19. The non-transitory computer readable medium of claim 18, wherein the one or more known property characteristics comprise at least one of a property age, a property elevation, a property slope, a year built, a year renovated, and a building height.

20. The non-transitory computer readable medium of claim 15, wherein:
receiving identification of the property and the at least one property characteristic comprises receiving, via a network from a remote computing device, the identification of the property; and
the instructions, when executed by the processing circuitry, cause the processing circuitry to provide, via the network to a graphical user interface at the remote computing device in real-time responsive to receiving the at least one property characteristic, the at least one risk estimate.

* * * * *